(12) United States Patent
Sangle-Ferriere

(10) Patent No.: US 12,445,201 B2
(45) Date of Patent: Oct. 14, 2025

(54) OPTICAL ROUTER FOR DISTRIBUTING OPTICAL SIGNALS

(71) Applicant: Bruno Sangle-Ferriere, Paris (FR)

(72) Inventor: Bruno Sangle-Ferriere, Paris (FR)

( * ) Notice: Subject to any disclaimer, the term of this patent is extended or adjusted under 35 U.S.C. 154(b) by 258 days.

(21) Appl. No.: 18/242,157

(22) Filed: Sep. 5, 2023

(65) Prior Publication Data

US 2024/0106539 A1    Mar. 28, 2024

(30) Foreign Application Priority Data

Sep. 6, 2022    (FR) ...................................... 2208919

(51) Int. Cl.
*H04B 10/27*    (2013.01)
*H04B 10/40*    (2013.01)

(52) U.S. Cl.
CPC ............. *H04B 10/27* (2013.01); *H04B 10/40* (2013.01)

(58) Field of Classification Search
CPC ................................. H04B 10/27; H04B 10/40
USPC ......................................................... 398/49
See application file for complete search history.

(56) References Cited

U.S. PATENT DOCUMENTS

| | | | | |
|---|---|---|---|---|
| 6,097,517 A | * | 8/2000 | Okayama ........... | H04Q 11/0005 398/1 |
| 7,715,713 B1 | * | 5/2010 | Iyer ..................... | H04J 14/0227 398/58 |
| 2002/0145784 A1 | | 10/2002 | Zhang et al. | |
| 2007/0003186 A1 | * | 1/2007 | Wagener ............ | H04Q 11/0005 385/17 |
| 2007/0286605 A1 | * | 12/2007 | Feuer .................. | H04J 14/0212 398/83 |
| 2012/0237155 A1 | | 9/2012 | Zheng et al. | |
| 2017/0082908 A1 | * | 3/2017 | Sharkawy .......... | H04Q 11/0005 |

FOREIGN PATENT DOCUMENTS

| | | |
|---|---|---|
| FR | 3125658 A1 | 1/2023 |
| FR | 3125659 A1 | 1/2023 |

* cited by examiner

*Primary Examiner* — Dalzid E Singh
(74) *Attorney, Agent, or Firm* — Jason A. Smith; Shumaker, Loop & Kendrick, LLP

(57) ABSTRACT

Optical router for distributing optical signals, including at least three input/output ports, each designed to be optically connected to a transceiver, each input/output port comprising an optical routing system connected to a plurality of optical paths, each of the optical paths also being connected to another of the optical routing systems so as to optically connect the input/output port to each of the other input/output ports, the optical routing system being configured to passively direct an optical signal received by the input/output port into one of the optical paths chosen on the basis of the wavelength of said optical signal.

17 Claims, 12 Drawing Sheets

OPTICAL ROUTER FOR DISTRIBUTING OPTICAL SIGNALS

TECHNICAL FIELD

The invention relates to the communication of information via optical signals, in particular to optical routing devices for distributing optical signals between various optoelectronic systems.

BACKGROUND

It is nowadays common for a transceiver to communicate information to other transceivers via optical signals.

When a transceiver is connected to multiple other transceivers in order to communicate different information depending on each of the other transceivers, it is common to use one or more passive optical routers, also called PON (Passive Optical Network) routers.

A passive optical router (PON) comprises a single input and a plurality of outputs, and makes it possible to distribute an optical signal received via the single input to one or more of the outputs and to transmit optical signals received via each of the outputs to the single input. An optical signal is steered from the single input to one or more of the outputs by distributing the power of the signal across optical fibres of the passive optical router. There is therefore a significant loss of optical energy depending on the number of divisions needed to steer the signal from the single input to one or more of the outputs. Moreover, the passive optical router (PON) is not suitable for photonic communication: indeed, during such communication, photons are steered randomly to one of the various outputs of the passive optical router (PON).

When a first transceiver connected to one of the outputs of the passive optical router (PON) seeks to send information to a second transceiver connected to another of the outputs of the passive optical router (PON), then the first transceiver has to transmit the information to a relay connected to the single input of the passive optical router (PON), which in turn transmits the information to the second transceiver. Communicating information between two transceivers connected to different outputs of a passive optical router (PON) therefore proves complex. Moreover, the passive optical routers (PON) from the prior art are not suitable for transmitting information based on successive photons, such a single photon entering via a single input being able to exit via any one of the numerous outputs.

There is therefore a need to improve passive optical routers in order to overcome the abovementioned problems. In particular, there is a need for an optical router for communicating information between various transceivers, the communication being easy to implement and exhibiting low energy loss.

The aim of the invention is to at least partially address this need.

SUMMARY

To this end, the invention relates to an optical router for distributing optical signals, comprising at least three input/output ports, each designed to be optically connected to a transceiver that is configured to transmit and receive optical signals at a plurality of different wavelengths, each input/output port comprising an optical routing system connected to a plurality of optical paths internal to the optical router, each of the optical paths also being connected to another of the optical routing systems so as to optically connect the input/output port to each of the other input/output ports, the optical routing system being configured to passively direct an optical signal received by the input/output port into one of the optical paths chosen on the basis of the wavelength of said optical signal, the optical path via which an optical signal of a given wavelength is directed from a first input/output port to a second input/output port being the same optical path as that taken by an optical signal of the given wavelength from the second input/output port to the first input/output port.

An "optical path", in the sense of the present invention, is understood to mean the route intended to be followed by an optical signal. An optical path may thus comprise the route intended to be followed by the light beam of the optical signal in a transparent medium. An optical path may comprise one or more waveguides within which the optical signals are intended to travel. Preferably, the waveguides are optical fibres or channel guides. More preferably, the channel has a rectangular base, preferably a square base, with a side of between 0.020 µm and 5 µm for example, preferably between 0.15 µm and 5 µm. The channel of the channel guide may be ribbon-shaped, inscribed on the surface or buried.

An "optical signal", in the sense of the present invention, is understood to mean a photon, a series of photons or a light wave.

Each optical routing system is connected to at least N−1 optical paths, N being equal to the number of input/output ports of the optical router.

The optical router according to the present invention advantageously allows each of the transceivers connected thereto to communicate directly with one another without relays, without the optical signals interfering with one another and with little energy loss. Communication between the various transceivers is thus made much easier. Since there is little photon loss during communication between one transceiver and another transceiver, the optical router according to the present invention is particularly suitable for communication based on photon polarization and/or entangled photons. Moreover and advantageously, each of the transceivers is connected to only a single input/output port of an optical router according to the present invention, and the optical router is therefore easy to use.

The optical router may comprise more than three input/output ports, preferably more than ten.

The optical routing systems may be configured to passively direct optical signals with wavelengths in the ultraviolet, the visible or the infrared, for example between 169 nm and 14 µm.

An optical routing system may be configured to passively and simultaneously direct optical signals to one and the same optical path for a plurality of different wavelengths, for example for wavelengths within a wavelength band of predefined width. The optical router according to the present invention thus allows communication of information between two transceivers with optical signals of different wavelengths that are sent simultaneously, thereby making it possible to increase information transmission speed.

Preferably, at least one, preferably each of the optical routing systems comprises one or more switches for directing an optical signal on the basis of its wavelength, each switch being chosen from among:
 a prism made of dispersive transparent material,
 a resonator coupler comprising first and second waveguides and at least one ring resonator arranged between the first and second waveguides, the ring resonator being configured to transmit an optical signal from the first waveguide to the second waveguide, and vice versa, on the basis of the wavelength of the optical signal, an optical coupler comprising two waveguides comprising a section in which the two waveguides are brought closer to one another so as to transmit an optical signal from one of the waveguides to the other of the waveguides on the basis of the wavelength of the optical signal, a Bragg filter inclined with respect to the direction of propagation of the incident signal and configured to transmit, in the direction of propagation of the incident signal, or reflect, in a direction other than that of propagation of the incident signal, an incident optical signal on the basis of its wavelength, a Bragg grating, preferably inscribed in a waveguide.

The refractive indices of the materials used for successive Bragg filters or for successive resonator couplers may be chosen on the basis of the width of the wavelength band for which an optical routing system passively directs optical signals to one and the same optical path.

The prism may be covered with at least one anti-reflective layer. This makes it possible to limit optical energy losses resulting from unwanted reflections caused by changes in refractive index during steering of the optical signal.

The resonator coupler may comprise a plurality of ring resonators arranged between the first and second waveguides such that the transmission of an optical signal from the first waveguide to the second waveguide, and vice versa, takes place by virtue of said optical signal passing through each of the ring resonators. The wavelength at which the ring resonators transmit an optical signal may be the same for each of the ring resonators. The ring resonators may be identical.

The resonator coupler may comprise waveguides between each of the ring resonators, said waveguides being connected to the first waveguide. Said waveguides thus make it possible to recombine, together towards one and the same output, an optical signal not transmitted by some of the ring resonators. Preferably, the length of said waveguides is adapted so as to avoid destructive interference during the recombination of the optical signals.

Preferably, at least one, preferably each of the optical routing systems comprises first and second groups of switches configured to passively direct an optical signal, transmitted by the transceiver connected to the input/output port, to one and the same other input/output port chosen on the basis of the wavelength of said optical signal, said optical routing system comprising a polarizing filter arranged upstream of the set of switches, said polarizing filter being configured to steer said optical signal to the first group of switches if said optical signal exhibits a first polarization, for example vertical, or to the second group of switches if said optical signal exhibits a second polarization perpendicular to the first polarization, for example horizontal, said optical routing system comprising a polarization rotator configured to rotate the polarization of the optical signal by 90°, arranged between the polarizing filter and the second group of switches. The optical routing system is thus designed to direct an optical signal regardless of its polarization and the switches that are chosen. This is particularly beneficial when at least one of the chosen switches works only with electromagnetic waves with a given polarization, for example transelectric; for example, said switch is a resonator coupler.

"Upstream of the set of switches" should be understood to mean that the polarizing filter is arranged so as to be between the set of switches and a transceiver, when it is connected to the input/output port.

According to one variant, each of the optical routing systems comprises first and second groups of switches, and the optical paths at the output of the first group of switches, respectively of the second group of switches, of an optical routing system are connected to the first groups of switches, respectively to the second groups of switches, of the other optical routing systems.

According to another variant, the first and second groups of switches are configured to passively direct an optical signal, transmitted by the transceiver connected to the input/output port, to one and the same optical path chosen on the basis of the wavelength of said optical signal, the optical routing system comprising, for each optical path, a polarizing filter between the set of switches and said optical path, each of the polarizing filters being configured to steer an optical signal to the first group of switches, if said optical signal exhibits the first polarization, or to the second group of switches, if said optical signal exhibits the second polarization, said optical routing system comprising a polarization rotator configured to rotate the polarization of the optical signal by 90°, arranged between each of said polarizing filters and the second group of switches.

According to another preferred variant, each of the optical routing systems comprises first and second groups of switches configured to passively direct an optical signal, transmitted by the transceiver connected to the input/output port, to one and the same other input/output port chosen on the basis of the wavelength of said optical signal, said optical routing system comprising a polarizing filter arranged upstream of the set of switches, said polarizing filter being configured to steer said optical signal to the first group of switches if said optical signal exhibits a first polarization, for example vertical, or to the second group of switches if said optical signal exhibits a second polarization perpendicular to the first polarization, for example horizontal, said optical routing system comprising a polarization rotator configured to rotate the polarization of the optical signal by 90°, arranged between the polarizing filter and the second group of switches, and the optical paths at the output of the first group of switches, respectively of the second group of switches, of an optical routing system are connected to the second groups of switches, respectively to the first groups of switches, of the other optical routing systems. This preferred variant also corresponds to a cross optical router.

Preferably, the polarizing filters consist of birefringent crystals, for example prisms or plates made of birefringent materials.

The couplings between the polarizing filters and the waveguides are implemented so as to allow the transmission of an optical signal regardless of its wavelength.

The waveguides of the switches may be optical fibres or channel guides. Preferably, the channel has a rectangular base, preferably a square base, with a side of between 0.020 μm and 5 μm for example, preferably between 0.15 μm and 5 μm. The channel of the channel guide may be ribbon-shaped, inscribed on the surface or buried.

At least one of the input/output ports may comprise a connector to which a transceiver is intended to be connected, the connector being configured to optically connect a transceiver, possibly extended by an optical fibre or a channel guide, to the optical routing system of said input/output port.

Preferably, at least one of the optical routing systems comprises connections configured to optically connect the switches to one another and/or to optically connect the switches to the connector.

The connections may be light rays passing through air or a vacuum, optical fibres or channel guides. Preferably, the channel of the channel guide has a rectangular base, preferably a square base, with a side of between 0.020 µm and 5 µm for example, preferably between 0.15 µm and 5 µm. The channel of the channel guide may be ribbon-shaped, inscribed on the surface or buried.

At least one of the connections may comprise, at at least one of its ends, a mode converter configured to switch from single-mode guidance to multimode guidance, or vice versa.

At least one of the connections may comprise, at at least one of its ends, a butt coupling for optically connecting an optical fibre to a channel guide. the optical fibre belonging to a switch or to the connector and the channel guide belonging to the connector or to a switch, respectively.

At least one of the connections may comprise, at the end of an optical fibre, a lens for optically connecting said optical fibre to a channel guide, by focusing the optical signal on one end of the channel, the optical fibre belonging to a switch or to the connector and the channel guide belonging to the connector or to a switch, respectively.

The optical routing systems may comprise at least one lens arranged between one of the connections and one of the prisms or one of the Bragg filters, the lens being configured to direct the light rays at the output of the connection in the form of a parallel-ray light beam to the prism or the Bragg filter and vice versa.

The optical router may comprise a housing in which the optical routing systems and the optical paths are housed.

The optical router may comprise at least two housings, the optical routing systems of some of the input/output ports being housed in one of the housings and the optical routing systems of other input/output ports being housed in the other of the housings. Preferably, the optical router comprises at least one multiplexer configured such that at least two of the optical paths, intended to carry optical signals of different wavelengths and interconnecting two optical routing systems housed in housings different from one another, are coincident along their portion between the two housings.

The optical router may be configured to modify the polarization of the transmitted optical signal such that the polarization of said optical signal at the output of the optical router is perpendicular to the polarization of said optical signal at the input of the optical router. Such an optical router is referred to as a cross optical router. Advantageously, this facilitates the use of transceivers comprising a light source and a complex detector or absorber. In particular, a cross optical router facilitates the use of transceivers configured to transmit an optical signal with a first polarization, for example linear and vertical, and to receive an optical signal with a second polarization, the second polarization being perpendicular to the first polarization, for example linear and horizontal. Other pairs of complementary polarizations may be used, for example the first polarization may be circular in a first direction and the second polarization may be circular in a second direction, the second direction being opposite the first direction.

The cross optical router may comprise a polarization rotator arranged on each of the optical paths connecting two routing systems and configured to rotate the polarization of an optical signal travelling in the corresponding optical path by 90°. These polarization rotators are preferred when the optical routing systems are designed for any kind of polarization, for example if these switches are inclined Bragg filters and/or prisms. Said polarization rotators may comprise half-wave plates or Faraday rotators.

As an alternative, the cross optical router may comprise a polarization rotator arranged in each of the input/output ports upstream of the set of switches of the corresponding input/output port, each polarization rotator being configured to rotate the polarization of an optical signal travelling in the corresponding optical path by 45°. Thus, when an optical signal is transmitted through said cross optical router, it passes through two polarization rotators according to the above, which causes the polarization of said optical signal to rotate by a total of 90°. These polarization rotators are preferred when the switches of the cross optical router are adapted only to a single type of polarization, for example transelectric, for example if these switches are resonator couplers. Said polarization rotators may comprise Faraday rotators or chiral materials.

According to one preferred alternative, at least one, preferably each of the optical routing systems comprises first and second groups of switches configured to passively direct an optical signal, transmitted by the transceiver connected to the input/output port, to one and the same other input/output port chosen on the basis of the wavelength of said optical signal, said optical routing system comprising a polarizing filter arranged upstream of the set of switches, said polarizing filter being configured to steer said optical signal to the first group of switches if said optical signal exhibits a first polarization, for example vertical, or to the second group of switches if said optical signal exhibits a second polarization perpendicular to the first polarization, for example horizontal, said optical routing system comprising a polarization rotator configured to rotate the polarization of the optical signal by 90°, arranged between the polarizing filter and the second group of switches. The optical routing system is thus designed to direct an optical signal regardless of its polarization and the switches that are chosen. This is particularly beneficial when at least one of the chosen switches works only with electromagnetic waves with a given polarization, for example transelectric; for example, said switch is a resonator coupler.

The invention also relates to an optical communication system comprising at least one optical router as described above and, for each optical router, a plurality of transceivers configured to transmit and receive optical signals at a plurality of different wavelengths, each of the transceivers being connected to one of the input/output ports of the optical router.

Preferably, at least one, preferably each of the transceivers is configured to transmit and receive optical signals at a plurality of different wavelengths at least equal to N minus one, N being equal to the number of input/output ports of the optical router to which the transceiver is connected.

At least one of the transceivers may be configured to transmit and receive optical signals at a plurality of different wavelengths at least equal to N, N being equal to the number of input/output ports of the optical router to which the transceiver is connected. This is particularly advantageous if the number N is odd, for example if N is equal to 3, because the optical communication system may be designed such that the transceiver is able to be connected to any of the input/output ports of the optical router.

The optical communication system may comprise at least two optical routers and an active router connected to the two optical routers, the active router being configured to receive an optical signal, comprising information, from a transceiver connected to one of the two optical routers and to transmit an optical signal, comprising said information, to another transceiver connected to the other of the two optical routers. Preferably, the information comprises an indication, for example the identity, of the other transceiver intended to receive said information.

At least one of the transceivers may comprise a plurality of lasers, each laser being configured to emit a laser optical signal having a wavelength different from the other lasers. Preferably, said transceiver is configured such that the laser optical signals are directed to one and the same optical output of said transceiver, the optical output being connected to the corresponding input/output port. More preferably, said optical output is also an optical input configured to receive optical signals from the corresponding input/output port.

The communication system may be used for communication based on entangled photons, as described for example in patent applications FR3125658A1 and FR3125659A1. To this end, at least one, preferably each of the transceivers may comprise first and second complex absorbers and a source configured to generate at least one pair of entangled photons comprising a first photon emitted on a first propagation path connected to the first complex absorber and a second photon emitted on a second propagation path connected to the input/output port connected to said transceiver, the first complex absorber being configured to absorb the first photon in a polarization state chosen from two complementary polarizations, the second complex absorber being configured to collect the photons emitted by another of the transceivers and/or originating from the optical router, multiply said photons and measure the mean polarization of the photons resulting from the multiplication.

The communication system is thus suitable for communicating quantum information based on entangled photons, the wavelength of the pair of entangled photons being chosen on the basis of the transceiver with which the entangled-photon source and the first complex absorber wish to communicate. In other words, the second photon is directed, on the basis of its wavelength, by the optical router to the transceiver with which the entangled-photon source and the first complex absorber wish to communicate.

The communication system according to the invention advantageously makes it possible to simplify the communication based on entangled photons between numerous transceivers according to the above, and in a more compact manner. In particular, the entire communication system may be integrated into a limited number of housings. In particular, each transceiver may group together all of its components in a single housing.

The first propagation path and/or the second propagation path may comprise an optical fibre. Preferably, the length of the first propagation path is twice the length of the second propagation path between the transceiver and the router for each of the transceivers comprising first and second complex absorbers and an entangled-photon source. The transport time of the entangled first and second photons between their emission and their reception is thus substantially the same. The first propagation path may for example be arranged along the second propagation path on the portion between the entangled-photon source and the router, and then take a circular arc so as to return to the first complex absorber while being arranged along the same second propagation path. According to another example, the first propagation path is wound and arranged inside or outside the housing of the transceiver.

Preferably, the transceivers are each connected to the optical router by an optical fibre of the same length.

Preferably, the optical router is a cross optical router and the optical communication system comprises, for each of said one or more transceivers, a polarizing filter, called internal polarizing filter, preferably a birefringent crystal, arranged on the propagation path linked to the input/output port of the transceiver; the polarizing filter being configured to steer an optical signal transmitted by the transceiver, in particular by the source, to the optical router, if said optical signal exhibits a first polarization, and to steer an optical signal from the optical router to the second complex absorber, if said signal exhibits a second polarization perpendicular to the first polarization. Preferably, the optical signal transmitted by the source consists of entangled photons with a fixed polarization, for example linear and vertical, allowing it to be directed to the input/output port to which the transceiver is connected via said internal polarizing filter.

For functional reasons, the optical path travelled from the entangled-photon source to the target transceiver receiving the information is preferably longer than the optical path travelled between the entangled-photon source and the first complex absorber of the transceiver used to send the information. To this end, an additional optical fibre, for example 5 to 10 cm long, may be inserted in the housing of the transceiver between said internal polarizing filter and the second complex absorber.

In one variant, the router that is used is not a cross router, each transceiver then preferably being provided with a 45° polarization rotator such as a Faraday rotator.

The optical communication system may comprise a polarizing device on the second propagation path at the output of each of the transceivers and at each input/output port of the optical router, the polarization device being configured to transform a linearly polarized optical signal into a circularly polarized optical signal. Advantageously, this makes it possible to overcome constraints concerning the polarization direction of the photons in the optical fibres connecting the transceivers to the optical router.

The invention also relates to an optical communication method comprising the use of an optical communication system as described above, the use comprising one of the transceivers, called first transceiver, transmitting an optical signal and at least one other of the transceivers, called second transceiver, receiving the optical signal.

The first and second transceivers may be connected to a first electronic component, respectively a second electronic component, the use comprising communicating information from the first electronic component to the second electronic component by transmitting an optical signal from the first transceiver and the second transceiver receiving said optical signal. The first and second electronic components may be processors and/or memory blocks and/or network peripherals and/or computer peripherals.

Preferably, the use comprises a calibration step during which at least one of the transceivers, called transceiver to be calibrated, sends at least one optical signal at a given wavelength, and the optical signal is then received by another of the transceivers, which sends back an optical response signal indicating its identity at the same said given wavelength, and the transceiver to be calibrated then records the identity of the other transceiver and associates it with the given wavelength.

Preferably, the optical signal transmitted by the transceiver to be calibrated indicates the identity of said transceiver and the other transceiver records the identity of the transceiver to be calibrated and associates it with the given wavelength.

During the calibration step, the transceiver to be calibrated may send a plurality of optical signals, each at a given wavelength different from the other optical signals, such that the transceiver to be calibrated records the identity and the associated given wavelength of each of the other transceivers connected to the optical router. The sending of the plurality of optical signals may be simultaneous.

BRIEF DESCRIPTION OF THE DRAWINGS

Other advantages and features will become more apparent on reading the detailed description, given by way of illustration and without limitation, with reference to the following figures.

DETAILED DESCRIPTION

Figure 1:
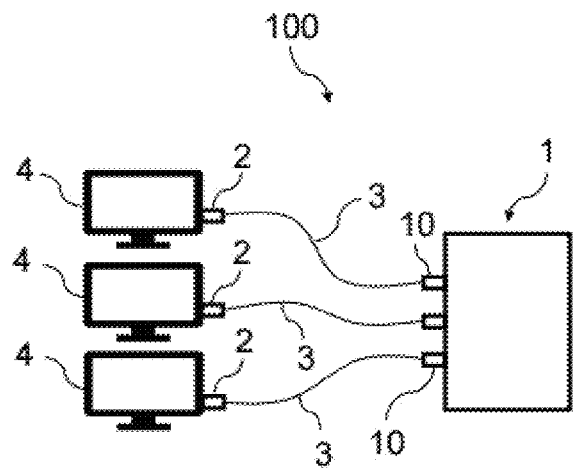
FIG. 1 is a diagram showing an optical communication system according to the invention.

FIG. 1 illustrates an optical communication system 100 according to the invention, which comprises an optical router 1 according to the invention and a plurality of transceivers 2.

Each of the transceivers 2 is connected to an electronic component 4 and is also optically connected to an input/output port 10 of the optical router 1 via an optical fibre 3. The transceivers 2 connected to the optical router 1 are thus able to communicate with one another, the optical router 1 distributing the optical communication signals between said transceivers 2, thereby enabling the information transmissions between the various electronic components 4.

Figure 2A:
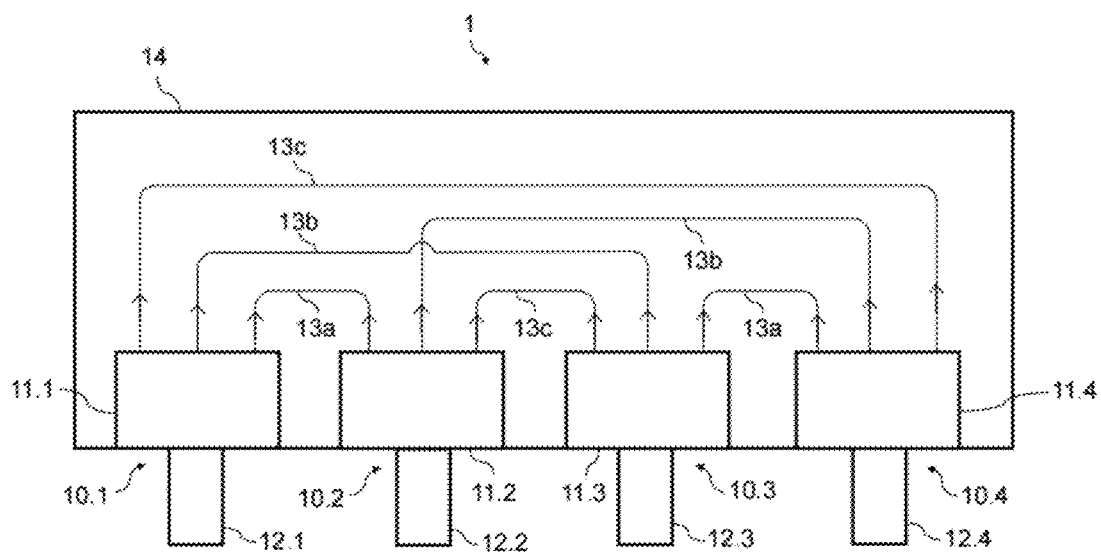
FIGS. 2A and 2B are each a diagram showing one embodiment of an optical router according to the invention.

FIG. 2A illustrates a first example of an optical router 1 according to the invention. The optical router 1 comprises four input/output ports 10.1-10.4, each comprising an optical routing system 11.1-11.4 and a connector 12.1-12.4 designed for the connection of an optical fibre 3.

Each optical routing system 11.1-11.4 is optically connected to each of the other optical routing systems 11.1-11.4 by optical paths 13a-13c. The optical paths 13a, 13b and 13c are intended to transmit optical signals of wavelength $\lambda_a$, $\lambda_b$ and $\lambda_c$, respectively. In other words, the optical routing systems 11.1-11.4 direct an optical signal of wavelength $\lambda_a$, $\lambda_b$ or $\lambda_c$, respectively, into an optical path 13a, 13b or 13c. The optical router 1 may comprise a housing 14 in which the optical paths 13a-13c and the optical routing systems 11.1-11.4 are housed.

For example, an optical signal of wavelength $\lambda_a$ received by the input/output port 10.1, respectively 10.3, will be directed by the optical routing system 11.1, respectively 11.3, into an optical path 13a, which will transmit said optical signal to the input/output port 10.2, respectively 10.4. Conversely, an optical signal of wavelength $\lambda_a$ received by the input/output port 10.2, respectively 10.4, will be directed by the optical routing system 11.2, respectively 11.4, into an optical path 13a, which will transmit said optical signal to the input/output port 10.1, respectively 10.3.

Table 1 below shows the assignment of wavelengths for communication between the various input/output ports 10.1-10.4 of the optical router 1 according to FIG. 2A.

TABLE 1

|  | Output port 10.1 | Output port 10.2 | Output port 10.3 | Output port 10.4 |
| --- | --- | --- | --- | --- |
| Input port 10.1 | Ø | $\lambda_a$ | $\lambda_b$ | $\lambda_c$ |
| Input port 10.2 | $\lambda_a$ | Ø | $\lambda_c$ | $\lambda_b$ |

TABLE 1-continued

|  | Output port 10.1 | Output port 10.2 | Output port 10.3 | Output port 10.4 |
|---|---|---|---|---|
| Input port 10.3 | $\lambda_b$ | $\lambda_c$ | Ø | $\lambda_a$ |
| Input port 10.4 | $\lambda_c$ | $\lambda_b$ | $\lambda_a$ | Ø |

As shown in Table 1, it is sufficient for a transceiver 2 connected to one of the input/output ports 10.1-10.4 of the optical router 1 to be configured to transmit and receive optical signals at at least three different wavelengths in order for said transceiver 2 to be able to transmit or receive optical signals to or from each of the other input/output ports 10.1-10.4 of the optical router 1.

Figure 2B:
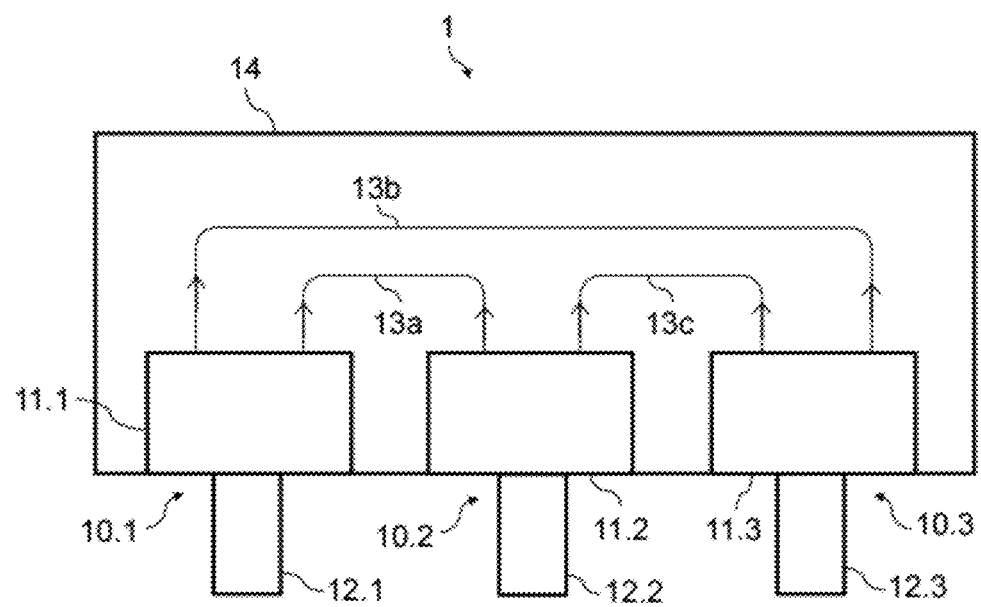

FIG. 2B illustrates a second example of an optical router 1 according to the invention. The optical router 1 is similar to that from FIG. 2A except that it comprises three input/output ports 10.1-10.3, each comprising an optical routing system 11.1-11.3 and a connector 12.1-12.3 designed for the connection of an optical fibre 3.

The optical router 1 also comprises optical paths 13a, 13b and 13c intended to transmit optical signals of wavelength $\lambda_a$, $\lambda_b$ and $\lambda_c$, respectively. The optical routing system 11.1 directs an optical signal of wavelength $\lambda_a$, respectively $\lambda_b$, into the optical path 13a, respectively 13b. The optical routing system 11.2 directs an optical signal of wavelength $\lambda_a$, respectively $\lambda_c$, into the optical path 13a, respectively 13c. The optical routing system 11.3 directs an optical signal of wavelength $\lambda_b$, respectively $\lambda_c$, into the optical path 13b, respectively 13c.

Table 2 below shows the assignment of wavelengths for communication between the various input/output ports 10.1-10.3 of the optical router 1 according to FIG. 2B.

TABLE 2

|  | Output port 10.1 | Output port 10.2 | Output port 10.3 |
|---|---|---|---|
| Input port 10.1 | Ø | $\lambda_a$ | $\lambda_b$ |
| Input port 10.2 | $\lambda_a$ | Ø | $\lambda_c$ |

TABLE 2-continued

|  | Output port 10.1 | Output port 10.2 | Output port 10.3 |
|---|---|---|---|
| Input port 10.3 | $\lambda_b$ | $\lambda_c$ | Ø |

As shown in Table 2, it is sufficient for a transceiver 2 connected to one of the input/output ports 10.1-10.3 of the optical router 1 to be configured to transmit and receive optical signals at at least two different wavelengths in order for said transceiver 2 to be able to transmit or receive optical signals to or from each of the other input/output ports 10.1-10.3 of the optical router 1. However, and unlike the optical router 1 from FIG. 2A, the wavelengths used for communication depend on the input/output port 10.1-10.3 to which the transceiver 2 is connected.

In each of the embodiments of FIGS. 2A and 2B, the optical paths 13 may be waveguides, for example channel guides or optical fibres. Preferably, the waveguides 13 do not intersect. For example, the waveguides 13 may overlap one another. Moreover, the connectors 12 are only preferred, and the transceivers 2 may be optically connected to the optical routing systems 11 directly, that is to say by a free-space optical beam or else by an optical guide of a transceiver 2 soldered to the optical router 1.

Of course, the number of input/output ports 10 may be any number greater than or equal to three. For example, an optical router 1 according to the invention may comprise six input/output ports 10.1-10.6, or even eight input/output ports 10.1-10.8, or even ten input/output ports 10.1-10.10, or even more than ten input/output ports. Tables 3, 4 and 5 below respectively show the wavelength assignments for communication between six input/output ports 10.1-10.6, eight input/output ports 10.1-10.8, and ten input/output ports 10.1-10.10 of an optical router 1 according to the invention.

TABLE 3

|  | Output port 10.1 | Output port 10.2 | Output port 10.3 | Output port 10.4 | Output port 10.5 | Output port 10.6 |
|---|---|---|---|---|---|---|
| Input port 10.1 | Ø | $\lambda_a$ | $\lambda_b$ | $\lambda_c$ | $\lambda_d$ | $\lambda_e$ |
| Input port 10.2 | $\lambda_a$ | Ø | $\lambda_c$ | $\lambda_d$ | $\lambda_e$ | $\lambda_b$ |
| Input port 10.3 | $\lambda_b$ | $\lambda_c$ | Ø | $\lambda_e$ | $\lambda_a$ | $\lambda_d$ |
| Input port 10.4 | $\lambda_c$ | $\lambda_d$ | $\lambda_e$ | Ø | $\lambda_b$ | $\lambda_a$ |
| Output port 10.5 | $\lambda_d$ | $\lambda_e$ | $\lambda_a$ | $\lambda_b$ | Ø | $\lambda_c$ |
| Output port 10.6 | $\lambda_e$ | $\lambda_b$ | $\lambda_d$ | $\lambda_a$ | $\lambda_c$ | Ø |

TABLE 4

|  | Output port 10.1 | Output port 10.2 | Output port 10.3 | Output port 10.4 | Output port 10.5 | Output port 10.6 | Output port 10.7 | Output port 10.8 |
|---|---|---|---|---|---|---|---|---|
| Input port | Ø | $\lambda_a$ | $\lambda_b$ | $\lambda_c$ | $\lambda_d$ | $\lambda_e$ | $\lambda_f$ | $\lambda_g$ |

TABLE 4-continued

| | Output port 10.1 | Output port 10.2 | Output port 10.3 | Output port 10.4 | Output port 10.5 | Output port 10.6 | Output port 10.7 | Output port 10.8 |
|---|---|---|---|---|---|---|---|---|
| 10.1 | | | | | | | | |
| Input port 10.2 | $\lambda_a$ | Ø | $\lambda_c$ | $\lambda_b$ | $\lambda_g$ | $\lambda_d$ | $\lambda_e$ | $\lambda_f$ |
| Input port 10.3 | $\lambda_b$ | $\lambda_c$ | Ø | $\lambda_a$ | $\lambda_f$ | $\lambda_g$ | $\lambda_d$ | $\lambda_e$ |
| Input port 10.4 | $\lambda_c$ | $\lambda_b$ | $\lambda_a$ | Ø | $\lambda_e$ | $\lambda_f$ | $\lambda_g$ | $\lambda_d$ |
| Output port 10.5 | $\lambda_d$ | $\lambda_g$ | $\lambda_f$ | $\lambda_e$ | Ø | $\lambda_a$ | $\lambda_b$ | $\lambda_c$ |
| Output port 10.6 | $\lambda_e$ | $\lambda_d$ | $\lambda_g$ | $\lambda_f$ | $\lambda_a$ | Ø | $\lambda_c$ | $\lambda_b$ |
| Output port 10.7 | $\lambda_f$ | $\lambda_e$ | $\lambda_d$ | $\lambda_g$ | $\lambda_b$ | $\lambda_c$ | Ø | $\lambda_a$ |
| Output port 10.8 | $\lambda_g$ | $\lambda_f$ | $\lambda_e$ | $\lambda_d$ | $\lambda_c$ | $\lambda_b$ | $\lambda_a$ | Ø |

TABLE 5

| | Output port 10.1 | Output port 10.2 | Output port 10.3 | Output port 10.4 | Output port 10.5 | Output port 10.6 | Output port 10.7 | Output port 10.8 | Output port 10.9 | Output port 10.10 |
|---|---|---|---|---|---|---|---|---|---|---|
| Input port 10.1 | Ø | $\lambda_a$ | $\lambda_b$ | $\lambda_c$ | $\lambda_d$ | $\lambda_e$ | $\lambda_f$ | $\lambda_g$ | $\lambda_h$ | $\lambda_i$ |
| Input port 10.2 | $\lambda_a$ | Ø | $\lambda_c$ | $\lambda_d$ | $\lambda_e$ | $\lambda_f$ | $\lambda_g$ | $\lambda_h$ | $\lambda_i$ | $\lambda_b$ |
| Input port 10.3 | $\lambda_b$ | $\lambda_c$ | Ø | $\lambda_e$ | $\lambda_f$ | $\lambda_g$ | $\lambda_h$ | $\lambda_i$ | $\lambda_d$ | $\lambda_a$ |
| Input port 10.4 | $\lambda_c$ | $\lambda_d$ | $\lambda_e$ | Ø | $\lambda_g$ | $\lambda_h$ | $\lambda_i$ | $\lambda_a$ | $\lambda_b$ | $\lambda_f$ |
| Output port 10.5 | $\lambda_d$ | $\lambda_e$ | $\lambda_f$ | $\lambda_g$ | Ø | $\lambda_i$ | $\lambda_b$ | $\lambda_c$ | $\lambda_a$ | $\lambda_h$ |
| Output port 10.6 | $\lambda_e$ | $\lambda_f$ | $\lambda_g$ | $\lambda_h$ | $\lambda_i$ | Ø | $\lambda_a$ | $\lambda_b$ | $\lambda_c$ | $\lambda_d$ |
| Output port 10.7 | $\lambda_f$ | $\lambda_g$ | $\lambda_h$ | $\lambda_i$ | $\lambda_b$ | $\lambda_a$ | Ø | $\lambda_d$ | $\lambda_e$ | $\lambda_c$ |
| Output port 10.8 | $\lambda_g$ | $\lambda_h$ | $\lambda_i$ | $\lambda_a$ | $\lambda_c$ | $\lambda_b$ | $\lambda_d$ | Ø | $\lambda_f$ | $\lambda_e$ |
| Output port 10.9 | $\lambda_h$ | $\lambda_i$ | $\lambda_d$ | $\lambda_b$ | $\lambda_a$ | $\lambda_c$ | $\lambda_e$ | $\lambda_f$ | Ø | $\lambda_g$ |
| Output port 10.10 | $\lambda_i$ | $\lambda_b$ | $\lambda_a$ | $\lambda_f$ | $\lambda_h$ | $\lambda_d$ | $\lambda_c$ | $\lambda_e$ | $\lambda_g$ | Ø |

Figure 3A:
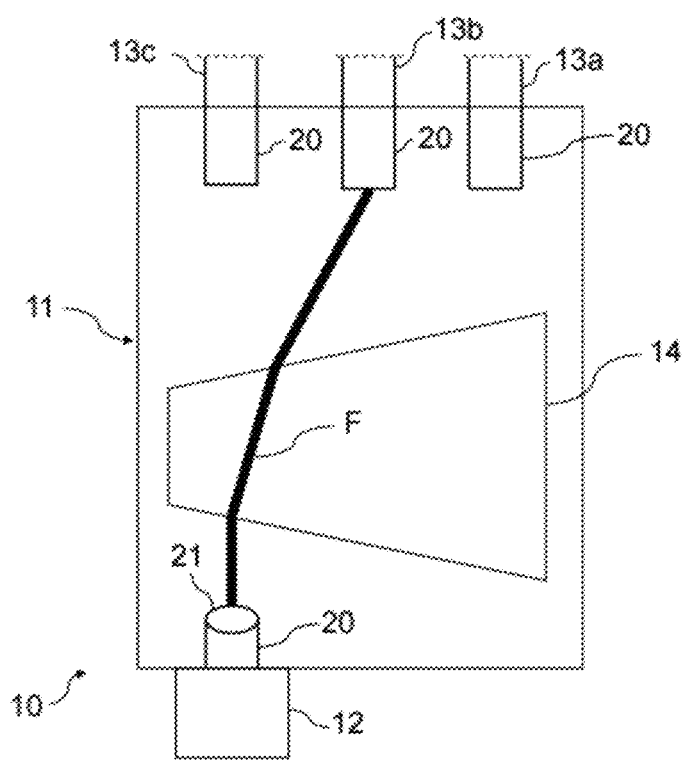
FIG. 3A is a diagram showing one embodiment of an optical routing system for an optical router according to FIG. 2A, the optical routing system comprising a prism made of dispersive material.

FIG. 3A illustrates a first embodiment of an optical routing system 11. The optical routing system 11 comprises a prism 14 made of dispersive transparent material, and connections 20.

One of the connections 20 optically connects the connector 12 to the prism 14 such that, when a transceiver 2 connected to the connector 12 transmits an optical signal, this is transmitted to the prism 14 in the form of a light beam F. The other connections 20 are each optically connected to one of the optical paths 13a-13c.

A lens 21 is arranged at the output of the connection 20 between the prism 14 and the connector 12. This lens 21 is configured to direct the light rays at the output of the connection 20 in the form of a parallel-ray light beam to the prism 14 and, conversely, to direct the parallel light rays at the output of the prism 14 into said connection 20.

Depending on the wavelength of the optical signal, the light beam F will be deflected more or less by the prism 14. The prism 14 thus directs the light beam F into one of the connections 20 connected to one of the optical paths 13a-13c on the basis of the wavelength of the optical signal.

For example, as illustrated in FIG. 3A, the optical signal has a wavelength $\lambda_b$ and the prism 14 deflects the light beam F to the connection 20 connected to the optical path 13b.

Conversely, according to the principle of reverse light return, an optical signal from one of the optical paths 13a-13c will be directed to the connection 20 connected to the connector 12.

Preferably, the connections 20 are configured so that the optical signal S propagates in the form of a plane wave in said connections 20.

Figure 3B:
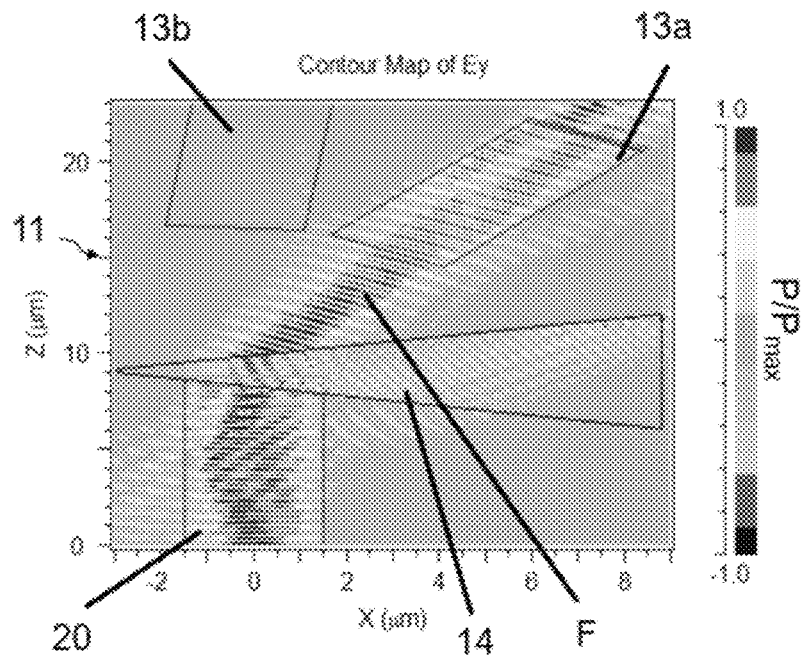
FIGS. 3B and 3C are simulations of an optical routing system for an optical router according to the invention, the optical routing system comprising a prism made of dispersive material.

FIG. 3B illustrates a computer simulation of an optical routing system 11 comprising a prism 14 made of a dispersive transparent material covered with an anti-reflective layer. The prism 14 is configured to direct optical signals of wavelengths $\lambda_a$, respectively $\lambda_b$, at the output of a connection 20 to an optical path 13a, respectively an optical path 13b. In the simulation shown, an optical signal of wavelength $\lambda_a$ is directed, in the form of a light beam F, to the optical path 13a.

The optical paths 13a and 13b are each waveguides whose width is substantially equal to three times the wavelength of the optical signals that they are intended to transmit.

Figure 3C:
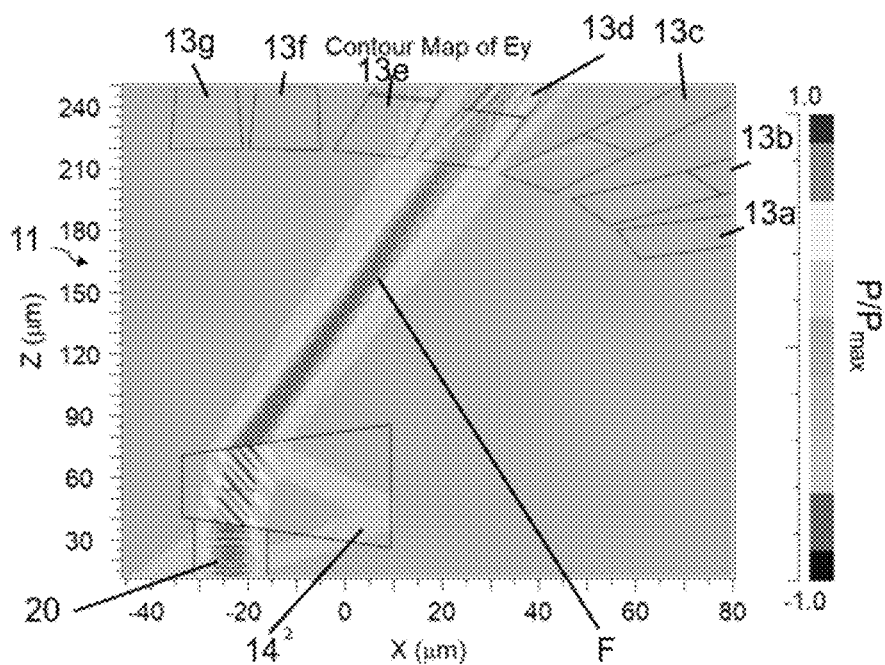

FIG. 3C illustrates a computer simulation of an optical routing system 11 comprising a prism 14 made of a dispersive transparent material covered with an anti-reflective layer. The prism 14 is configured to direct optical signals of wavelengths, respectively, $\lambda_a$, $\lambda_b$, $\lambda_c$, $\lambda_d$, $\lambda_e$, $\lambda_f$ and $\lambda_g$ at the output of a connection 20 to, respectively, an optical path 13a, an optical path 13b, an optical path 13c, an optical path 13d, an optical path 13e, an optical path 13f and an optical path 13g. In the simulation shown, an optical signal of wavelength $\lambda d$ is directed, in the form of a light beam F, to the optical path 13d.

The optical paths 13a to 13g are each waveguides whose width is substantially equal to fifteen times the wavelength of the optical signals that they are intended to transmit.

Figure 4:
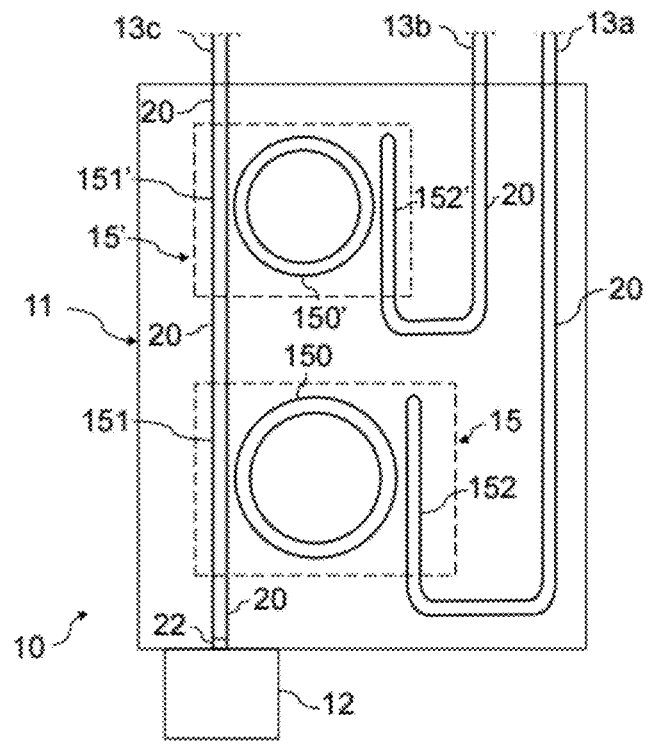
FIG. 4 is a diagram showing another embodiment of an optical routing system for an optical router according to FIG. 2A, the optical routing system comprising two resonator couplers.

FIG. 4 illustrates a second embodiment of an optical routing system 11. The optical routing system 11 comprises first and second resonator couplers 15 and 15', respectively, and connections 20.

The connections 20 here are inscribed channel guides. The connection 20 connected to the connector 12 comprises a butt coupling 22 soldered at its end connected to the connector 12. The butt coupling 22 allows the transmission of an optical signal from the inscribed channel guide 20 to the connector 12, and vice versa, with a signal loss of between 10% and 90%.

The first resonator coupler 15 comprises first and second inscribed channel waveguides 151 and 152, respectively, and a ring resonator 150 arranged between the first and second waveguides 151 and 152. The ring resonator 150 is configured to transmit an optical signal from the first waveguide 151 to the second waveguide 152 if the wavelength of the optical signal is $\lambda_a$, and to let through an optical signal without transmission from one waveguide to another if the wavelength of the optical signal is $\lambda_a$ or $\lambda_c$.

The second resonator coupler 15' comprises first and second inscribed channel waveguides 151' and 152', respectively, and a ring resonator 150' arranged between the first and second waveguides 151' and 152'. The ring resonator 150' is configured to transmit an optical signal from the first waveguide 151' to the second waveguide 152' if the wavelength of the optical signal is $\lambda_b$, and to let through an optical signal without transmission from one waveguide to another if the wavelength of the optical signal is $\lambda_a$ or $\lambda_c$.

Thus, when an optical signal is transmitted by a transceiver 2 connected to the connector 12, this will be transmitted by the first resonator coupler 15, or respectively by the second resonator coupler 15', to the optical path 13a, or respectively the optical path 13b, if the wavelength of the optical signal is $\lambda_a$, respectively $\lambda_b$. If the wavelength of the optical signal is $\lambda_c$, the optical signal will be directed to the optical path 13c without transmission by the first and second resonator couplers 15 and 15'.

Conversely, according to the principle of reverse light return, an optical signal from one of the optical paths 13a, 13b or 13c will be directed to the connection 20 connected to the connector 12 if the wavelengths of the lights are respectively $\lambda_a$, $\lambda_b$ or $\lambda_c$.

FIGS. 5A to 5D illustrate various embodiments of resonator couplers 15.

Figure 5A:
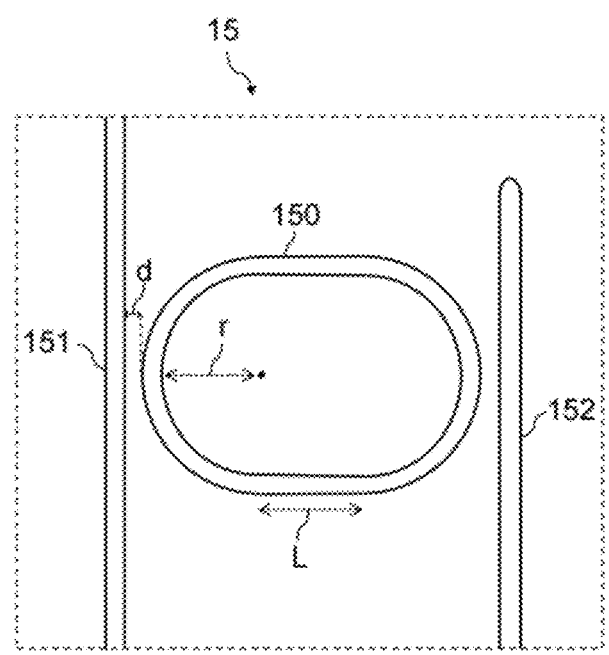
FIGS. 5A, 5B and 5C are each a diagram showing one embodiment of a resonator coupler for an optical routing system according to FIG. 4.

The resonator coupler 15 illustrated in FIG. 5A comprises first and second waveguides 151 and 152, respectively, optically coupled to a ring resonator 150. A person skilled in the art is generally aware of how to optically couple a ring resonator 150 to a waveguide 151 or 152. In particular, they are aware that the optical coupling depends on the radius of curvature r of the ring resonator 150 when bringing the waveguides 151 and 152 closer, on the distance d between the ring resonator 150 and the waveguides 151 and 152 and on the refractive index of the medium between the ring resonator 150 and the waveguide 151 or 152.

The ring resonator 150 comprises two semi-circles of radius r and spaced from one other by segments of length L. The radius r and the length L are chosen such that the perimeter of the ring resonator 150 multiplied by its refractive index is a multiple plus half of the wavelength $\lambda$ for which an optical signal is transmitted from the waveguide 151 to the waveguide 152.

The ring resonator 150 thus transmits optical signals of wavelength $\lambda$ from the first waveguide 151 to the second waveguide 152 and vice versa. The ring resonator 150 may also be a circle of radius r; in other words, the length L of the segments is equal to 0 µm.

The inventor has determined that, for waveguides 151 and 152 and for a ring resonator 150 with a refractive index equal to 3, a distance d between the ring resonator 150 and the waveguides 151 and 152 equal to 0.2 µm and for a refractive index of the transparent medium between the ring resonator 150 and the waveguides 151 and 152 equal to 1, for example, the transparent medium being air:

- the ring resonator 150 will transmit an optical signal of wavelength $\lambda_a$ equal to 1.33 µm if it is in the form of a circle of radius r equal to 1.62 µm;
- the ring resonator 150 will transmit an optical signal of wavelength $\lambda_b$ equal to 1.57 µm if it is in the form of a circle of radius r equal to 1.67 µm;
- the ring resonator 150 will transmit an optical signal of wavelength $\lambda_c$ equal to 1.11 µm if it is in the form of a circle of radius r equal to 1.65 µm;
- the ring resonator 150 will transmit an optical signal of wavelength $\lambda_d$ equal to 1.77 µm if it is in the form of a circle of radius r equal to 2.72 µm.

For each of the dimensions described in the above paragraph, the ring resonator 150 will not transmit an optical signal of wavelength $\lambda_e$ equal to 1.885 µm. An optical routing system 11 according to the invention may thus comprise a succession of four resonator couplers 15, each comprising a ring resonator 150 according to the above dimensions. Such an optical routing system 11 is designed to direct the optical signals of wavelengths, respectively, $\lambda_a$, $\lambda_b$, $\lambda_c$, $\lambda_d$ and $\lambda_e$ to, respectively, an optical path 13a, an optical path 13b, an optical path 13c, an optical path 13d and an optical path 13e.

Figure 5B:
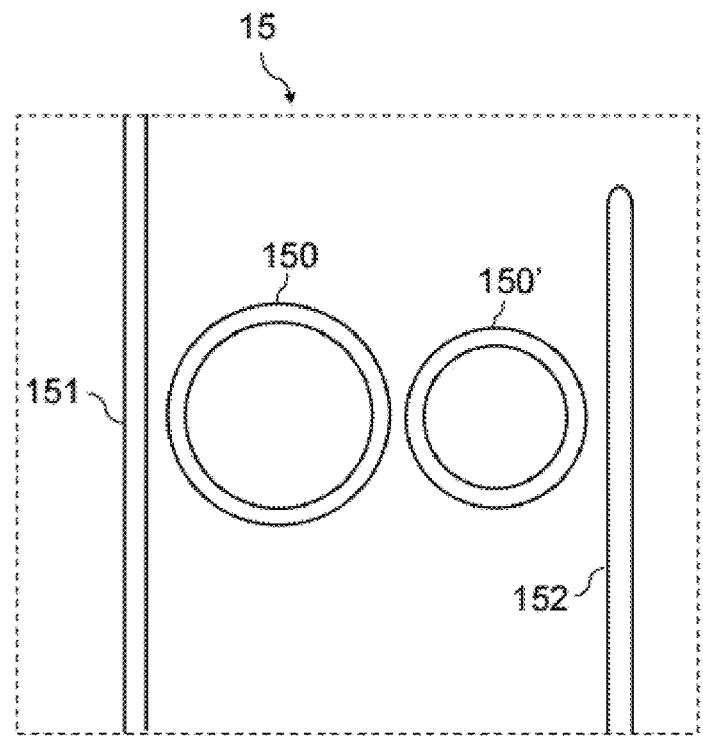

The resonator coupler 15 illustrated in FIG. 5B comprises a first waveguide 151 optically coupled to a first ring resonator 150 and a second waveguide 152 optically coupled to a second ring resonator 150', the first and second ring resonators 150 and 150' being optically coupled to one another.

The first and second ring resonators 150 and 150' have the shape of circles of different radii and therefore of different perimeters. The perimeter of the first ring resonator 150 multiplied by the refractive index of said ring resonator 150 is a multiple plus half of the wavelength λ for which an optical signal is transmitted from the waveguide 151 to the waveguide 152. The perimeter of the second ring resonator 150' multiplied by the refractive index of said ring resonator 150' is another multiple plus half of the wavelength λ for which an optical signal is transmitted from the waveguide 151 to the waveguide 152. The first and second ring resonators 150 and 150' thus transmit optical signals of wavelength λ from the first waveguide 151 to the second waveguide 152 and vice versa.

The embodiment illustrated in FIG. 5B advantageously makes it possible to precisely select wavelengths enabling the transmission of an optical signal from the first waveguide 151 to the second waveguide 152, and vice versa.

Figure 5C:
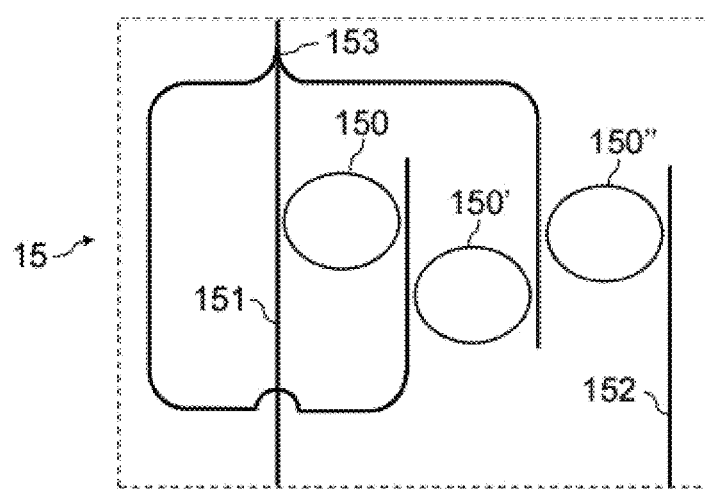

Another embodiment comprising a succession of three ring resonators 150, 150' and 150" is illustrated in FIG. 5C. The three ring resonators 150, 150' and 150" are identical and configured to transmit optical signals of wavelength λ. This embodiment allows even more precise selection of wavelengths for the transmission from the waveguide 151 to the waveguide 152. Optical signals whose wavelength is not close enough to λ will not be transmitted by each of the ring resonators 150, 150' and 150" from the waveguide 151 to the waveguide 152. Those portions of such optical signals that are not transmitted by each of the ring resonators 150, 150' and 150" are recombined together at the junction 153. Since the selection of the wavelengths for the transmission from the waveguide 151 to the waveguide 152 is more precise, it is advantageously possible to widen the bandwidth of the optical signals transmitted by the junction 153. The lengths of the waveguides in which said parts not transmitted by each of the ring resonators 150, 150' and 150" travel are determined such that the light waves meeting at the junction 153 are able to be added, regardless of their wavelength.

Figure 6:
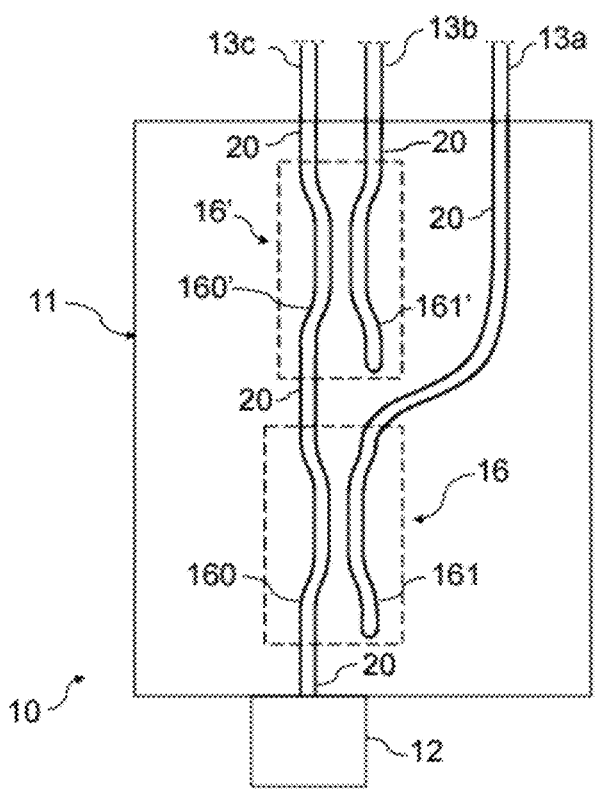
FIG. 6 is a diagram showing another embodiment of an optical routing system for an optical router according to FIG. 2A, the optical routing system comprising two optical couplers.

FIG. 6 illustrates a third embodiment of an optical routing system 11. The optical routing system 11 comprises first and second optical couplers 16 and 16', respectively, and connections 20.

Figure 7:
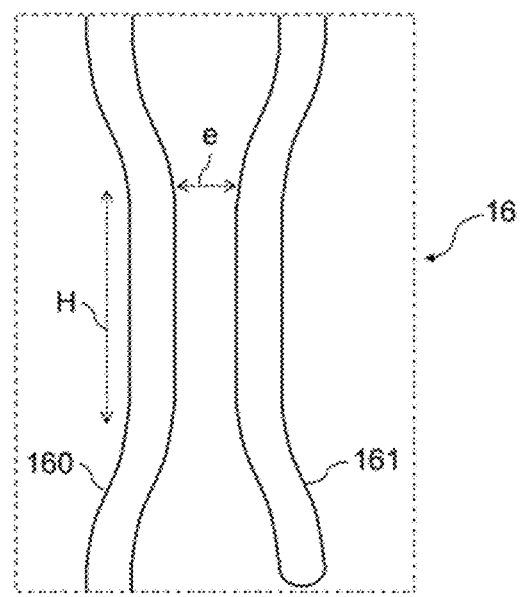
FIG. 7 is a diagram showing an optical coupler for an optical routing system according to FIG. 6.

FIG. 7 illustrates an optical coupler 16, which comprises first and second waveguides 160 and 161, respectively. The first and second waveguides 160 and 161 may be optical fibres or inscribed channel guides. The first and second waveguides 160 and 161 are brought closer to one another over a section of length H and in which the first and second waveguides 160 and 161 are separated by a distance e. The length H, the distance e and also the refractive index of the medium between the first and second waveguides 160 and 161 are determined so as to enable optical coupling of the first waveguide 160 with the second waveguide 161 for certain wavelengths.

In the embodiment illustrated in FIG. 6, the first optical coupler 16 is configured so as to transmit an optical signal from the first waveguide 160 to the second waveguide 161 if the wavelength of the optical signal is $\lambda_a$, and to let through an optical signal without transmission from one waveguide to another if the wavelength of the optical signal is $\lambda_b$ or $\lambda_c$.

The second optical coupler 16' is configured so as to transmit an optical signal from the first waveguide 160' to the second waveguide 161' if the wavelength of the optical signal is $\lambda_b$, and to let through an optical signal without transmission from one waveguide to another if the wavelength of the optical signal is $\lambda_c$.

Thus, when an optical signal is transmitted by a transceiver 2 connected to the connector 12, it will be transmitted by the first optical coupler 16, or respectively by the second optical coupler 16', to the optical path 13a, or respectively the optical path 13b, if the wavelength of the optical signal is $\lambda_a$, respectively $\lambda_b$. If the wavelength of the optical signal is $\lambda_c$, the optical signal will be directed to the optical path 13c without transmission by the first and second optical couplers 16 and 16'.

Conversely, an optical signal from one of the optical paths 13a, 13b or 13c will be directed to the connection 20 connected to the connector 12 if the wavelengths of the lights are respectively $\lambda_a$, $\lambda_b$ or $\lambda_c$.

Figure 8:
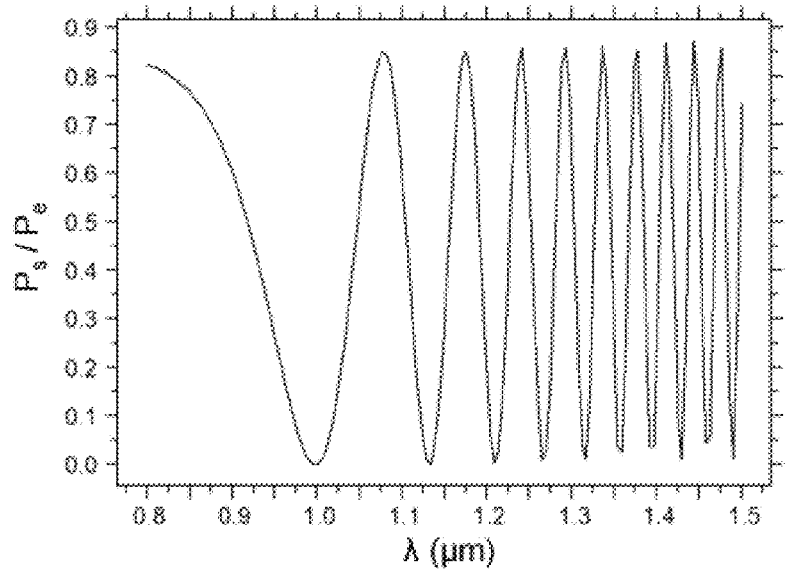
FIG. 8 is a curve showing the ratio of the output power to the input power of an optical signal after transmission of the optical signal by an optical coupler according to FIG. 7 as a function of wavelength.

FIG. 8 illustrates the ratio of the output power to the input power of an optical signal for an optical coupler 16 according to FIG. 7 as a function of the wavelength λ of the optical signal, the optical signal being transmitted from the first waveguide 160 to the second waveguide 161. As shown in FIG. 8, an optical coupler 16 is designed to transmit an optical signal from the first waveguide 160 to the second waveguide 161 for a plurality of different wavelengths.

An optical routing system 11 may therefore comprise a plurality of optical couplers 16 connected to one another in the form of a tree. Such an embodiment is illustrated in FIG. 9.

Figure 9:
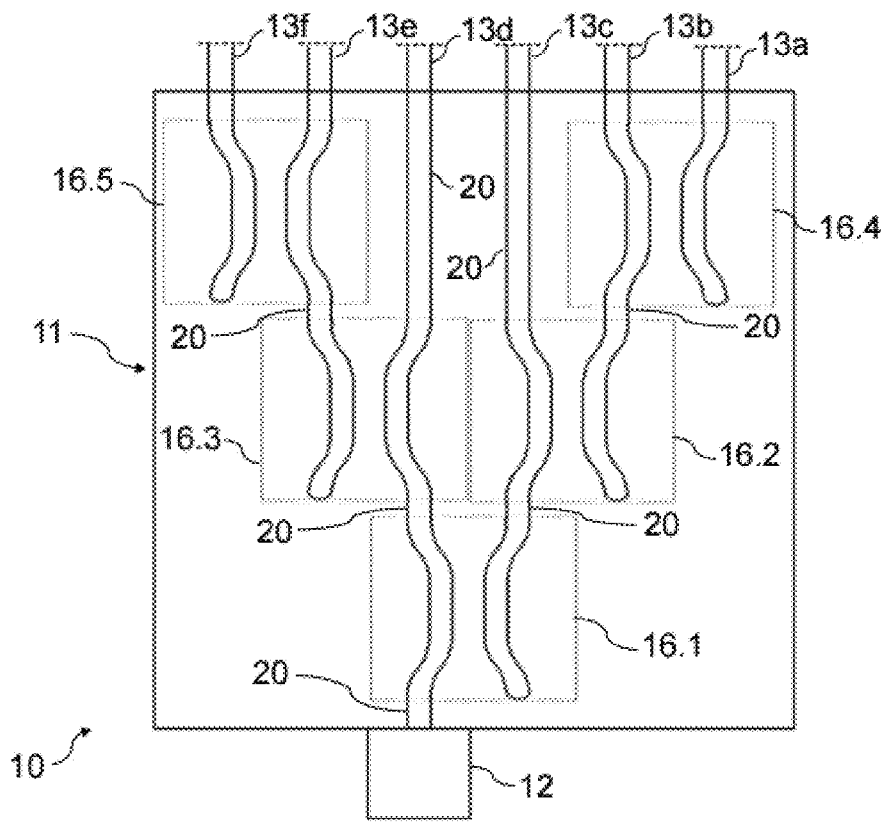
FIG. 9 is a diagram showing another embodiment of an optical routing system for an optical router according to the invention, the optical routing system comprising a plurality of optical couplers connected to one another in the form of a tree structure.

The optical routing system 11 illustrated in FIG. 9 is configured to direct an optical signal into six different optical paths 13a-13f on the basis of the wavelength of the optical signal. To this end, the optical routing system 11 comprises five different optical couplers 16.1-16.5 and connections 20 for optically connecting the optical couplers 16.1-16.5 to one another and to the optical paths 13a-13f and to the connector 12.

The optical coupler 16.1 is configured to transmit optical signals of wavelength $\lambda_a$, $\lambda_b$ or $\lambda_c$ to the optical coupler 16.2 and to let through optical signals of wavelength $\lambda_d$, $\lambda_e$ or $\lambda_f$ to the optical coupler 16.3. The optical coupler 16.2 is configured to transmit optical signals of wavelength $\lambda_a$ or $\lambda_b$ to the optical coupler 16.4 and to let through optical signals of wavelength $\lambda_c$ to the optical path 13c. The optical coupler 16.3 is configured to transmit optical signals of wavelength $\lambda_e$ or $\lambda_f$ to the optical coupler 16.5 and to let through optical signals of wavelength $\lambda_d$ to the optical path 13d. The optical coupler 16.4 is configured to transmit optical signals of wavelength $\lambda_a$ to the optical path 13a and to let through optical signals of wavelength $\lambda_b$ to the optical path 13b. The optical coupler 16.5 is configured to transmit optical signals of wavelength $\lambda_f$ to the optical path 13f and to let through optical signals of wavelength $\lambda_e$ to the optical path 13e.

Figure 10:
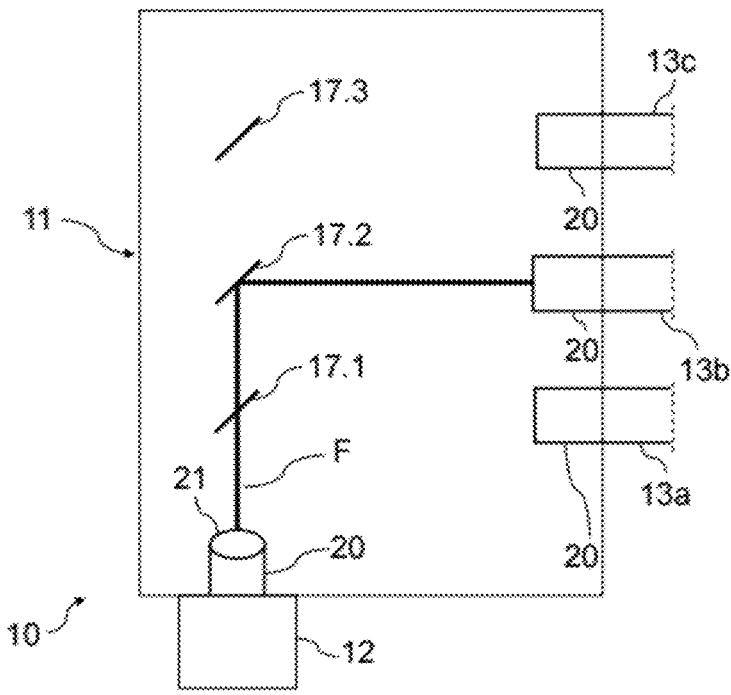
FIG. 10 is a diagram showing another embodiment of an optical routing system for an optical router according to the invention, the optical routing system comprising a plurality of inclined Bragg filters arranged in succession.

FIG. 10 illustrates a fourth embodiment of an optical routing system 11. The optical routing system 11 comprises a succession of three inclined Bragg filters 17.1, 17.2 and 17.3, each configured to transmit or reflect an optical signal on the basis of its wavelength.

The optical routing system 11 also comprises connections 20. A lens 21 is arranged at the output of the connection 20 between the Bragg filters 17.1, 17.2 and 17.3 and the connector 12 such that, when a transceiver 2 connected to the connector 12 transmits an optical signal, this is transmitted to the Bragg filters 17.1, 17.2 and 17.3 in the form of a parallel-ray light beam F. The other connections 20 are each optically connected to one of the optical paths 13a-13c.

The first Bragg filter 17.1 is configured so as to reflect optical signals of wavelength $\lambda_a$ to the connection 20 connected to the optical path 13a and to transmit optical signals of wavelength $\lambda_b$ or $\lambda_c$.

The second Bragg filter 17.2 is configured so as to reflect optical signals of wavelength to the connection 20 connected to the optical path 13b and to transmit optical signals of wavelength $\lambda_a$ or $\lambda_c$.

The third Bragg filter 17.3 is configured so as to reflect optical signals of wavelength $\lambda_c$ to the connection 20 connected to the optical path 13c and to transmit optical signals of wavelength $\lambda_a$ or $\lambda_b$.

An optical signal at the output of the connector 12 will thus be directed to one of the optical paths 13a-13c on the basis of its wavelength. For example, as illustrated in FIG. 10, the optical signal has a wavelength $\lambda_b$ and the second Bragg filter 17.2 reflects the light beam F to the connection 20 connected to the optical path 13b.

Conversely, according to the principle of reverse light return, an optical signal from one of the optical paths 13a-13c will be directed to the connection 20 connected to the connector 12.

According to another alternative not shown here, the optical routing system 11 may comprise other optical lenses inserted between the Bragg filters 17.1-17.3 and configured to focus the beam F so as to limit the flaring thereof. As an alternative, the optical routing system 11 may comprise a first transparent medium in which the beam F is intended to travel as far as the Bragg filters 17.1-17.3 and a second transparent medium, bordering the first transparent medium and having a refractive index lower than that of the first transparent medium so as to guide the beam F into the first transparent medium while letting through the beams reflected by the Bragg filters 17.1-17.3.

Figure 13:
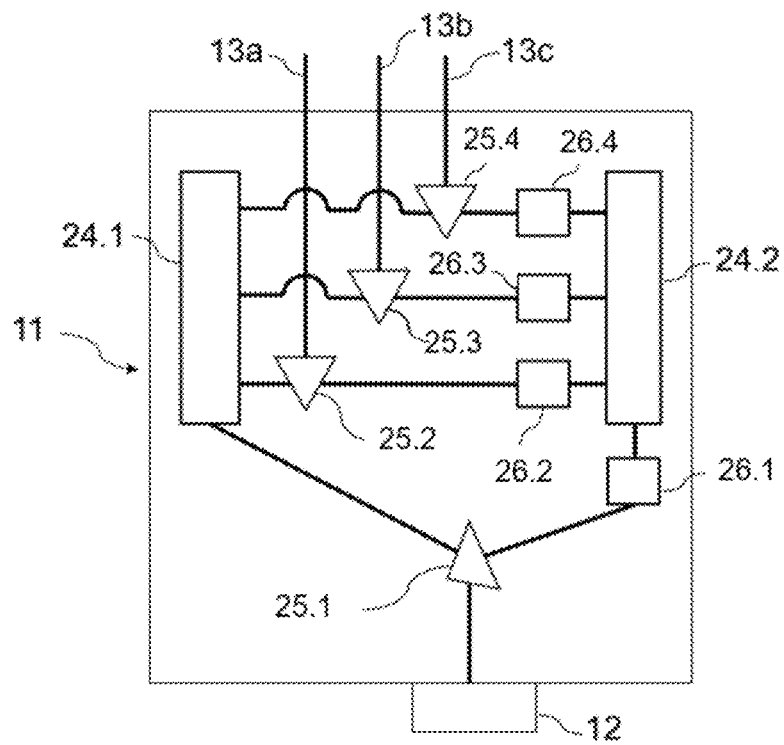
FIG. 13 is a diagram showing one embodiment of an optical routing system for an optical router according to the invention, the optical routing system comprising first and second groups of switches, polarizing filters and polarization rotators.

FIG. 13 illustrates another embodiment of an optical routing system 11. The optical routing system 11 comprises a first group of switches 24.1 and a second group of switches 24.2. The first and second groups of switches 24.1 and 24.2 are designed to direct electromagnetic waves whose electric field is perpendicular to the plane in which the waveguides of the switches are inscribed, also called "transelectric waves". Electromagnetic waves whose magnetic field is perpendicular to the plane in which the waveguides of the switches are inscribed are called "transmagnetic waves".

The optical routing system 11 comprises a first polarizing filter 25.1 configured to steer an optical signal entering the optical routing system 11 from the connector 12 to the first group of switches 24.1, if the polarization of this optical signal is vertical, and to the second group of switches 24.2, if the polarization of this optical signal is horizontal. A first polarization rotator 26.1 is arranged between the first polarizing filter 25.1 and the second group of switches 24.2. This first polarization rotator 26.1 is configured to rotate the polarization of the optical signal travelling through it by 90°.

The optical routing system also comprises a second polarizing filter 25.2, a third polarizing filter 25.3 and a fourth polarizing filter 25.4. The first group of switches 24.1 is configured to transmit the optical signal from the first polarizing filter 25.1 to the second polarizing filter 25.2, if its wavelength is equal to $\lambda_a$, to the third polarizing filter 25.3, if its wavelength is equal to $\lambda_b$, and to the fourth polarizing filter 25.4, if its wavelength is equal to $\lambda_c$. The second group of switches 24.2 is configured to transmit the optical signal from the first polarizing filter 25.1 to the second polarizing filter 25.2, if its wavelength is equal to $\lambda_a$, to the third polarizing filter 25.3, if its wavelength is equal to $\lambda_b$, and to the fourth polarizing filter 25.4, if its wavelength is equal to $\lambda_c$.

A second polarization rotator 26.2, a third polarization rotator 26.3, respectively a fourth polarization rotator 26.4, is arranged between the second group of switches 24.2 and, respectively, the second polarizing filter 25.2, the third polarizing filter 25.3 and the fourth polarizing filter 25.4. Each of the polarization rotators 26.2, 26.3 and 26.4 is configured to modify the polarization of the transelectric optical signal into a transmagnetic optical signal and vice versa.

The optical signals received by the second polarizing filter 25.2 from the first and second groups of switches 24.1 and 24.2 are directed to the optical path 13a. Similarly, the optical signals received by the third polarizing filter 25.3 from the first and second groups of switches 24.1 and 24.2 are directed to the optical path 13b. The optical signals received by the fourth polarizing filter 25.4 from the first and second groups of switches 24.1 and 24.2 are directed to the optical path 13c.

Figure 11:
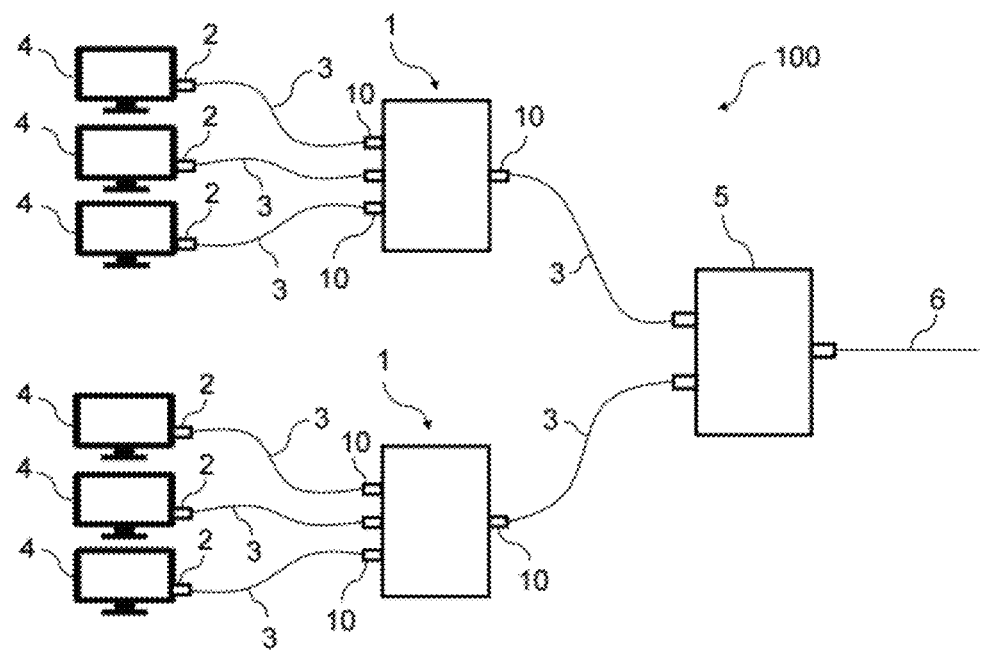
FIG. 11 is a diagram showing an optical communication system according to the invention.

FIG. 11 illustrates another embodiment of an optical communication system 100 according to the invention, this system comprising a plurality of optical routers 1 according to the invention and a plurality of transceivers 2.

Each of the transceivers 2 is connected to an electronic component 4, and is also optically connected to an input/output port 10 of one of the optical routers 1 via an optical fibre 3. The transceivers 2 connected to one and the same optical router 1 are thus able to communicate with one another, the optical router 1 distributing the optical communication signals between said transceivers 2, thereby enabling the information transmissions between the various electronic components 4.

An input/output port 10 of one optical router 1 may also be optically connected to an input/output port 10 of another optical router 1 via an active router 5, as illustrated in FIG. 11.

An active router 5 analyses a received optical signal in order to determine the recipient transceiver 2 and to transmit a new optical signal to the optical router 1 to which said transceiver 2 is optically connected, the optical signal having the appropriate wavelength for said optical router 1 to direct the optical signal to said transceiver 2.

The presence of an active router 5 in the optical communication system 100 is advantageous because it makes it possible to reduce the number of different wavelengths that the transceivers 2 have to transmit in order to communicate with one another.

For example, the optical communication system 100 comprises a first transceiver 2 connected to a first optical router 1, said first optical router 1 being configured to direct the optical signals at a first wavelength, respectively at a second wavelength, transmitted by said first transceiver 2, to another transceiver 2 connected to the first optical router 1, respectively to an active router 5 connected to the first optical router 1. The optical communication system 100 also comprises a second optical router 1 to which a second transceiver 2 is connected, the second optical router 1 being configured to direct the optical signals at the first wavelength transmitted by the active router 5 to the second transceiver 2. Thus, when the first transceiver 2 wishes to communicate with the second transceiver 2, it transmits an optical signal, containing the information of the recipient, at the second wavelength, said optical signal is directed by the first optical router 1 to the active router 5. which analyses it and then transmits a new optical signal at the first wavelength to the second optical router 1, said optical signal then being directed by the second optical router 1 to the second transceiver 2.

The optical communication system 100 may also comprise a connection 6 connecting the relay 5 to a communication network comprising a plurality of optical communication systems 100 that are connected to one another.

Figure 12A:
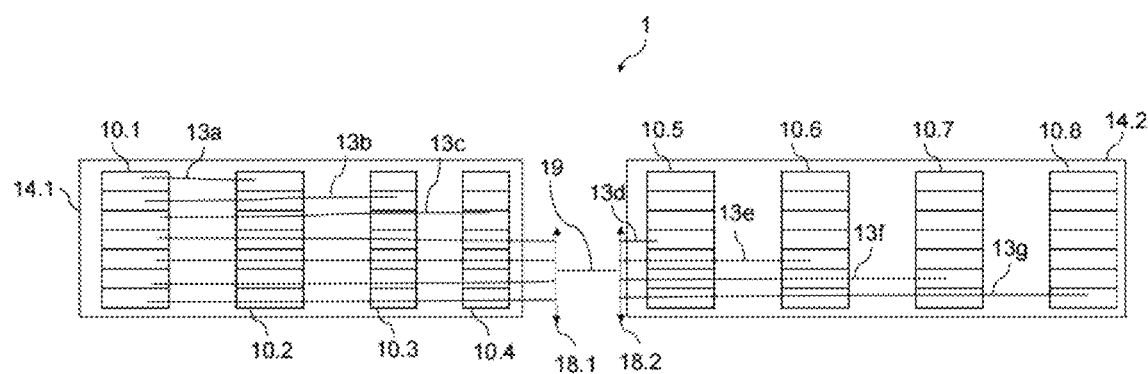
FIGS. 12A and 12B are each a diagram showing one embodiment of an optical router according to the invention, the optical router comprising two housings separated from one another.

FIG. 12A illustrates another embodiment of an optical router 1 according to the invention. The optical router 1 comprises eight input/output ports 10.1-10.8 and two housings 14.1 and 14.2. The input/output ports 10.1-10.4 are attached to the housing 14.1 and the input/output ports 10.5-10.8 are attached to the housing 14.2. The optical signals entering one of the input/output ports 10.1-10.8 are directed, on the basis of their wavelength, to another of the input/output ports 10.1-10.8 according to the above wavelength assignment Table 4.

FIG. 12A illustrates the various optical paths 13a-13g optically connecting the input/output port 10.1 to each of the other input/output ports 10.2-10.8. The optical paths 13a-13c are housed in the housing 14.1. The optical paths 13d-13g leave the housing 14.1 and then enter the other housing 14.2 so as to optically connect the input/output port 10.1 to the input/output ports 10.5-10.8.

The optical router 1 comprises a first multiplexer 18.1 and a second multiplexer 18.2 that are connected to the optical paths 13d-13g. The first multiplexer 18.1 is configured to concentrate all of the optical paths 13d-13g at the output of the housing 14.1 into a single waveguide 19. The second multiplexer 18.2 is configured to distribute each of the optical paths 13d-13g, then concentrated into the single waveguide 19, at the input of the other housing 14.2 to the corresponding input/output port 10.5-10.8. The optical paths 13d-13g are thus coincident between the housing 14.1 and the other housing 14.2.

Figure 12B:
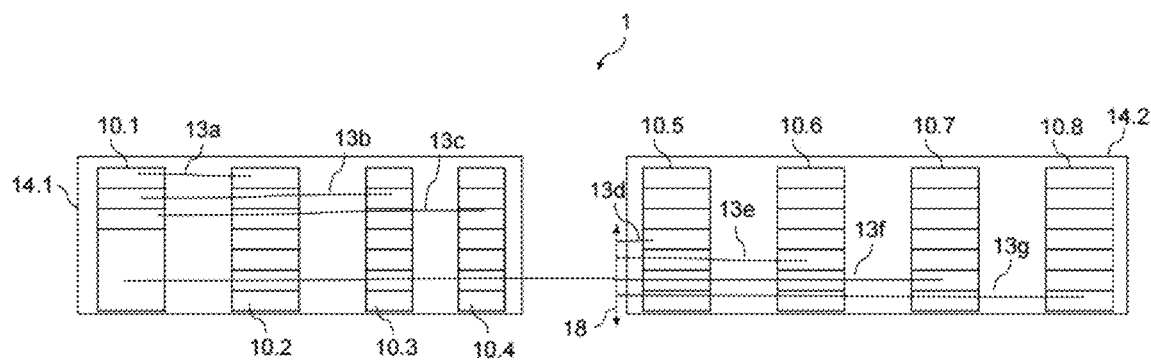

As an alternative, the optical router 1 may comprise a multiplexer 18, the optical paths 13d 13g being coincident between the input/output port 10.1 and the input into the housing 14.2, the multiplexer 18 being configured to separate the optical paths 13d-13g at the input of the housing 14.2 by distributing each optical path 13d-13g to the associated input/output port 10.5-10.8. This alternative is illustrated in FIG. 12B.

Figure 14:
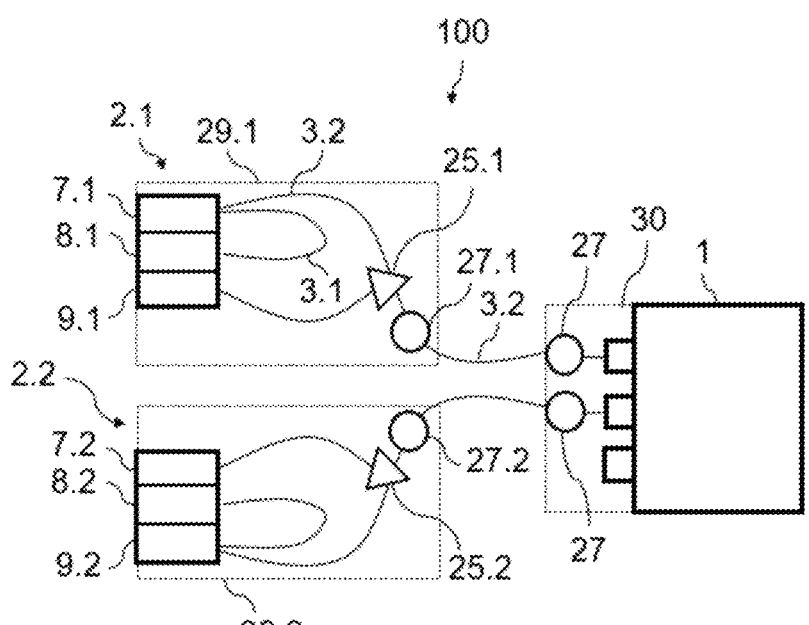
FIG. 14 is a diagram showing an optical communication system according to the invention for quantum communication based on entangled photons, integrating polarizing filters between the entangled-photon source and the optical router.

FIG. 14 illustrates one embodiment of an optical communication system 100 designed for quantum communication based on entangled photons. The communication system 100 from FIG. 14 differs from that from FIG. 1 in that the transceivers 2.1 and 2.2 comprise a source 7.1 or 7.2 configured to generate at least one pair of entangled photons, a first complex absorber 8.1 or 8.2 and a second complex absorber 9.1 or 9.2 configured to measure the mean polarization of the photons resulting from the amplifications of the received photons. The components of each of the transceivers 2.1 and 2.2 are integrated in a housing 29.1, respectively 29.2.

In addition, the optical router used in the optical communication system illustrated in FIG. 14 is a cross optical router, called cross optical router 1. In other words, the optical router 1 is configured to modify the polarization of the transmitted optical signal such that the polarization of said optical signal at the output of the optical router 1 is perpendicular to the polarization of said optical signal at the input of the optical router 1. The pair of entangled photons comprises a first photon emitted on a first propagation path 3.1 of length equal to 2L, and a second photon emitted on a second propagation path 3.2 of length equal to L.

The first propagation path 3.1 is connected to the first complex absorber 8.1. The first complex absorber 8.1 thus absorbs the first photon in a polarization state chosen from among the states of at least two different pairs of complementary polarization states.

The second propagation path 3.2 is connected to the input/output port 10 of the optical router 1. The optical router 1 thus directs the second photon to the transceiver 2.2 with which the source 7.1 and the first complex absorber 8.1 wish to communicate, called target transceiver 2.2. Said target transceiver 2.2 collects the second photon and measures its polarization. Since the first and second photons are entangled, the absorption of the first photon by the first complex absorber 8.1 instantaneously determines the polarization of the second photon.

The optical distance travelled by the second photon between the optical router 1 and the target transceiver 2.2 is equal to L. The distance travelled by the second photon is thus substantially the same as that travelled by the first photon. More precisely, the distance travelled by the second photon is very slightly greater than that travelled by the first photon, since the distance travelled by the second photon comprises the path through the optical router 1. Subsequently, the first complex absorber 8.1 may instantaneously determine the polarization of the second photon just before it reaches the target transceiver 2.2.

Moreover, the optical communication system 100 also comprises a polarizing filter 25.1 on the second propagation path 3.2 between the source 7.1 and the optical router 1.

The polarizing filter 25.1 makes it possible to steer an optical signal on the basis of its polarization. In particular, the source 7.1 is configured to transmit an optical signal, with entangled photons, with a first polarization, that will be steered, by the polarizing filter 25.1, to the cross optical router 1 and then directed to another transceiver 2.2. On the other hand, optical signals from the cross optical router 1 with a second polarization perpendicular to the first polarization are steered, by the polarizing filter 25.1, to the second complex absorber 9.1. The polarizing filter 25.1 therefore acts as a switch steering optical signals transmitted by the source 7.1 to the optical router 1 and optical signals received from the optical router 1 to the second complex absorber 9.1.

When a transceiver 2.1 wishes to communicate based on quantum entanglement with another transceiver 2.2, the source 7.1 of said transceiver 2.1 emits pairs of entangled photons at a wavelength for which the optical router 1 directs an optical signal to the other transceiver 2.2. Each pair of entangled photons comprises a first photon directed to the first complex absorber 8.1 of said transceiver 2.1, and a second photon with a first polarization to the polarizing filter 25.1. The polarizing filter 25.1 steers the second photon to the cross optical router 1. The cross optical router 1 modifies the polarization of the second photon to a second polarization perpendicular to the first polarization, then directs the second photon to another polarizing filter 25.2 arranged between the other transceiver 2.2 and the optical router 1. Since the second photon exhibits the second polarization, it is then steered by the other polarizing filter 25.2 to the second complex absorber 9.2 of the other transceiver 2.2.

Figure 15:
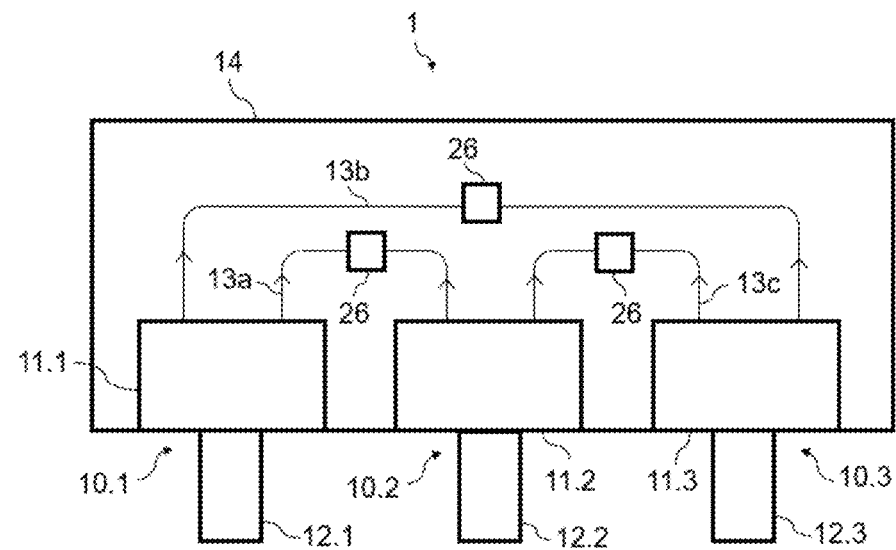
FIG. 15 is a diagram showing a first example of a cross optical router for the optical communication system illustrated in FIG. 14.

FIG. 15 illustrates a first example of a cross optical router 1. The cross optical router 1 comprises polarization rotators 26 on each of its optical paths 13a, 13b and 13c. Each polarization rotator 26 is configured to rotate the polarization of the optical signal travelling in the corresponding optical path 13a, 13b or 13c by 90°. An optical signal with the first polarization received by the optical router 1 will thus be transmitted to the transceiver 2 with the second polarization. Advantageously, this simplifies the optical communication system 100 since, for each transceiver 2, it is the same first polarization that may be used to transmit an optical signal from a source 7 to the optical router 1, and it is the same second polarization that may be used to receive an optical signal from the optical router 1 and steer it to the second complex absorber 9. The polarization rotators 26 may consist of half-wave plates adapted to the wavelength of the light passing through them.

Figure 16:
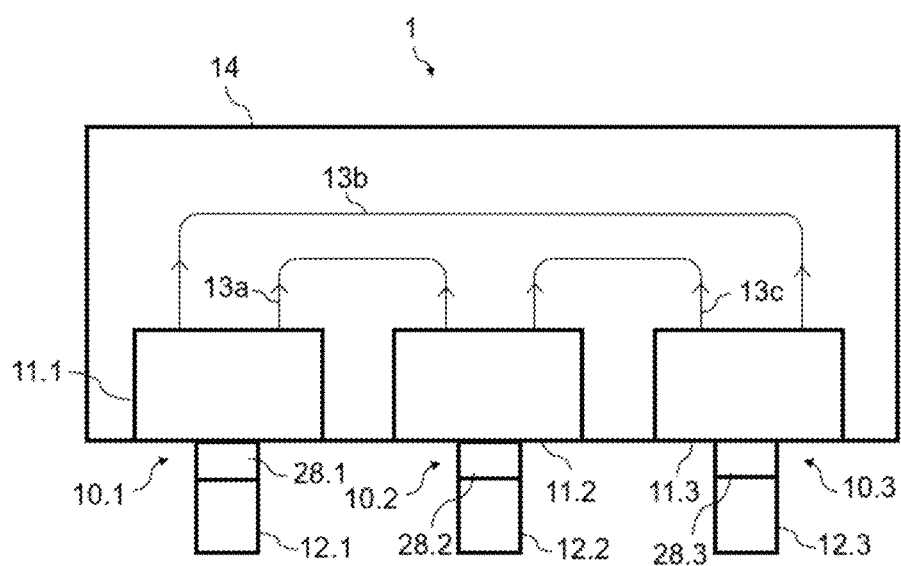
FIG. 16 is a diagram showing a second example of a cross optical router for the optical communication system illustrated in FIG. 14.

FIG. 16 illustrates another example of a cross optical router 1. The cross optical router 1 comprises polarization rotators 28.1, 28.2 and 28.3 in each of the input/output ports 10.1, 10.2 and 10.3, between the corresponding connector 12.1, 12.2 or 12.3 and the corresponding optical routing system 11.1, 11.2 and 11.3. Each polarization rotator 28.1, 28.2 and 28.3 is configured to rotate the polarization of the optical signal transmitted through said polarization rotator 28.1, 28.2 or 28.3 by 45°. An optical signal with the first polarization received by the optical router 1 will thus be transmitted to the transceiver 2 with the second polarization. Advantageously, this simplifies the optical communication system 100 since, for each transceiver 2, it is the same first polarization that may be used to transmit an optical signal from a source 7 to the optical router 1, and it is the same second polarization that may be used to receive an optical signal from the optical router 1 and steer it to the second complex absorber 9.

Figure 17:
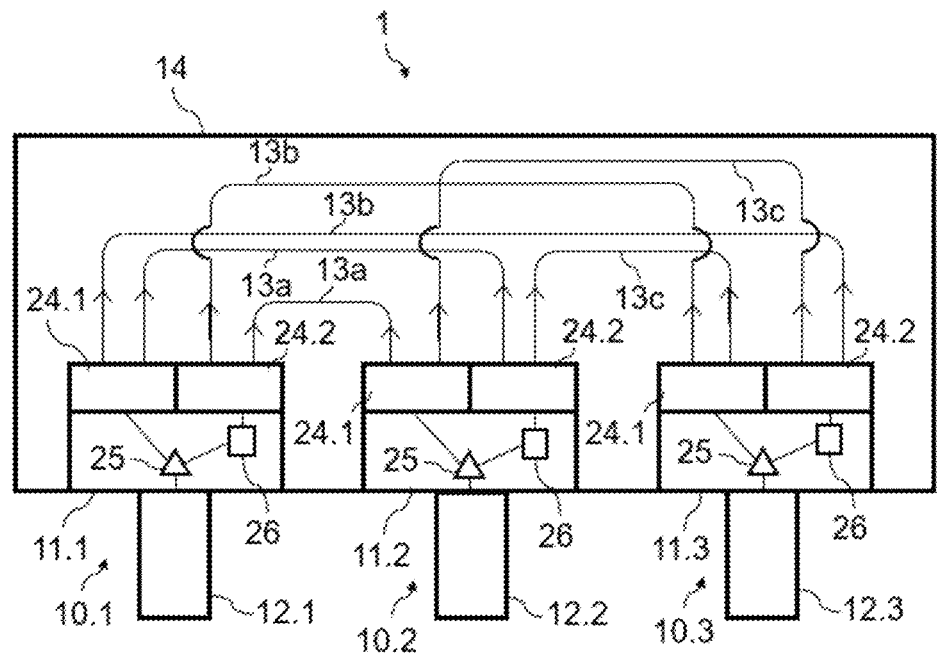
FIG. 17 is a diagram showing a third example of a cross optical router for the optical communication system illustrated in FIG. 14.

FIG. 17 illustrates one preferred variant of a cross optical router 1. In said cross optical router 1, each of the optical routing systems 11.1, 11.2 and 11.3 comprises a first group of switches 24.1 and a second group of switches 24.2. The first and second groups of switches 24.1 and 24.2 are designed to direct electromagnetic waves whose electric field is perpendicular to the plane in which the waveguides of the switches are inscribed, also called "transelectric waves". Electromagnetic waves whose magnetic field is perpendicular to the plane in which the waveguides of the switches are inscribed are called "transmagnetic waves".

Each of said optical routing systems 11.1, 11.2 and 11.3 comprises a polarizing filter 25 configured to steer an optical signal entering the optical routing system 11.1, 11.2 or 11.3 from the connector 12.1, 12.2 or 12.3 to the first group of switches 24.1, if the polarization of this optical signal is vertical, and to the second group of switches 24.2, if the polarization of this optical signal is horizontal. For each of said optical routing systems 11.1, 11.2 and 11.3, a polarization rotator 26 is arranged between the polarizing filter 25 and the second group of switches 24.2. This polarization rotator 26 is configured to rotate the polarization of the optical signal travelling through it by 90°.

For each optical routing system 11.1, 11.2 and 11.3, the optical paths 13a, 13b and 13c at the output of the first group of switches 24.1 are connected to the second groups of switches 24.2 of the other optical routing systems 11.1, 11.2 or 11.3. Similarly, for each optical routing system 11.1, 11.2 and 11.3, the optical paths 13a, 13b and 13c at the output of the second group of switches 24.2 are connected to the first groups of switches 24.1 of the other optical routing systems 11.1, 11.2 or 11.3.

Thus, when the input/output port 10.1 receives an optical signal polarized vertically by its connector 12.1, this optical signal is directed to the first group of switches 24.1 by the polarizing filter 25. The first group of switches 24.1 directs the optical signal to the second group of switches 24.2 of the optical routing system 11.2 if the optical signal is of wavelength $\lambda_a$, or to the second group of switches 24.2 of the optical routing system 11.3 if the optical signal is of wavelength $\lambda_b$. After passing through the corresponding second group of switches 24.2, the optical signal passes through the polarization rotator 26 of the optical routing system 11.2 or 11.3. The polarization of the optical signal is then rotated by 90° and becomes horizontal. The optical signal is then directed out of the optical router 1 by passing through the polarizing filter 25 of the optical routing system 11.2 or 11.3 and then through the connector 12.2 or 12.3.

Similarly, when the input/output port 10.1 receives an optical signal polarized horizontally by its connector 12.1, this optical signal is directed, by the polarizing filter 25 of the optical routing system 11.1, to the polarization rotator 26 of the optical routing system 11.1. The polarization of the optical signal is then rotated by 90° and becomes vertical. The optical signal is then directed to the second group of switches 24.2 of the optical routing system 11.1. The second group of switches 24.2 directs the optical signal to the first group of switches 24.1 of the optical routing system 11.2 if the optical signal is of wavelength $\lambda_a$, or to the first group of switches 24.1 of the optical routing system 11.3 if the optical signal is of wavelength $\lambda_b$. After passing through the corresponding first group of switches 24.1, the optical signal is directed out of the optical router 1 by passing through the polarizing filter 25 of the optical routing system 11.2 or 11.3 and then through the connector 12.2 or 12.3.

As illustrated in FIG. 14, the optical communication system 100 may also comprise two polarizing devices 27.1 and 27 or 27.2 and 27 on each second propagation path 3.2 between the corresponding polarizing filter 25.1, respectively 25.2, and the optical routing system 11 of the optical router 1. One of the two polarizing devices 27.1 or 27.2 is positioned just after the polarizing filter 25.1, respectively 25.2, with respect to the transceiver 2.1, respectively 2.2, and the other of the polarizing devices 27 may be positioned just before the input/output port 10 of the optical router 1. As an alternative, said other polarizing device 27 may be integrated in the input/output port 10 and/or in the housing 30 of the optical router 1, said other polarizing device 27 being arranged just before the optical routing system 11. The polarizing devices 27.1 or 27.2 may be housed in the housings 29.1, respectively 29.2, of the transceiver 2.1, respectively 2.2. Each polarizing device 27.1, 27.2 and 27 is configured to transform a linearly polarized optical signal into a circularly polarized optical signal. The optical signals travelling between the polarizing device 27.1 or 27.2 and the polarizing devices 27 are thus circularly polarized.

Figure 18:
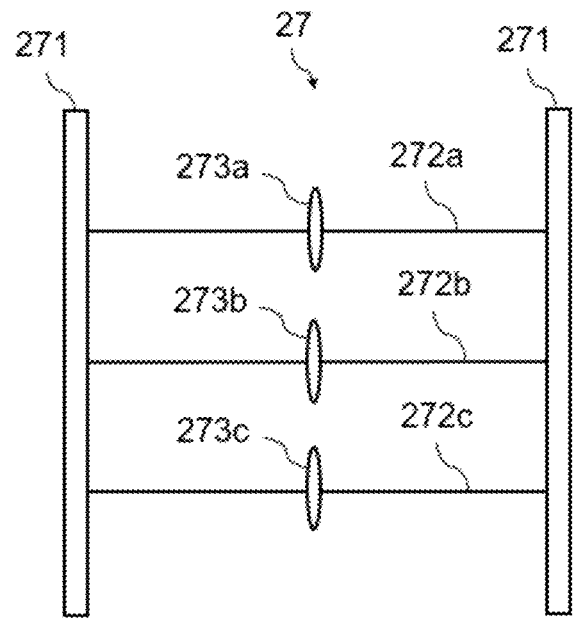
FIG. 18 is a diagram showing a polarizing device configured to transform a linearly polarized optical signal into a circularly polarized optical signal.

FIG. 18 illustrates a polarizing device 27 for the optical communication system 100 from FIG. 14. Since the polarizing device 27 has to operate for a plurality of wavelengths, it comprises two multiplexers 271, one at the input and the other at the output, in order to distribute the received optical signals into various optical paths 272a, 272b or 272c on the basis of their wavelength. For example, the multiplexers 271 are configured to transmit optical signals of wavelengths $\lambda_a$ in the optical path 272a, optical signals of wavelengths $\lambda_b$ in the optical path 272b, and optical signals of wavelengths $\lambda_c$ in the optical path 272c. The polarizing device 27 comprises, on each of its optical paths 272a, 272b and 272c, a quarter-wave plate 273a, 273b, respectively 273c. The quarter-wave plate 273a is configured to transform a linearly polarized optical signal of wavelength $\lambda_a$ into a circularly polarized optical signal of wavelength $\lambda_a$. The quarter-wave plate 273b is configured to transform a linearly polarized optical signal of wavelength $\lambda_b$ into a circularly polarized optical signal of wavelength $\lambda_b$. The quarter-wave plate 273c is configured to transform a linearly polarized optical signal of wavelength $\lambda_c$ into a circularly polarized optical signal of wavelength $\lambda_c$.

Other variants and improvements may be envisaged without however departing from the scope of the invention as defined by the following claims.

In particular, it is possible to combine the various embodiments of the optical routing systems 11 with one another. For example, an optical routing system 11 may comprise a prism 14 or a Bragg filter 17 and a plurality of resonator couplers 15 and/or a plurality of optical couplers 16, the prism 14 or the Bragg filter 17 being configured to transmit optical signals of wavelengths less than a predetermined length to a first group of resonator couplers 15 or optical couplers 16 and to transmit optical signals of wavelengths greater than the predetermined length to a second group of resonator couplers 15 or optical couplers 16.

The invention claimed is:

1. An optical router for distributing optical signals, comprising at least three input/output ports, each designed to be optically connected to a transceiver that is configured to transmit and receive optical signals at a plurality of different wavelengths, each input/output port comprising an optical routing system connected to a plurality of optical paths internal to the optical router, each of the optical paths also being connected to another of the optical routing systems so as to optically connect the input/output port to each of the other input/output ports, the optical routing system being configured to passively direct an optical signal received by the input/output port into one of the optical paths chosen on the basis of the wavelength of said optical signal, the optical path via which an optical signal of a given wavelength is directed from a first input/output port to a second input/output port being the same optical path as that taken by an optical signal of the given wavelength from the second input/output port to the first input/output port.

2. The optical router according to claim 1, at least one, preferably each of the optical routing systems comprising one or more switches for directing an optical signal on the basis of its wavelength, each switch being chosen from among:

a prism made of dispersive transparent material, a resonator coupler comprising first and second waveguides and at least one ring resonator arranged between the first and second waveguides, the ring resonator being configured to transmit an optical signal from the first waveguide to the second waveguide, and vice versa, on the basis of the wavelength of the optical signal, an optical coupler comprising two waveguides comprising a section in which the two waveguides are brought closer to one another so as to transmit an optical signal from one of the waveguides to the other of the waveguides on the basis of the wavelength of the optical signal, an inclined Bragg filter configured to transmit or reflect an optical signal on the basis of its wavelength, a Bragg grating.

3. The optical router according to claim 2, wherein the waveguides of the switches are optical fibres or channel guides.

4. The optical router according to claim 2, wherein at least one of the input/output ports comprises a connector to which a transceiver is to be connected, the connector configured to optically connect a transceiver to the optical routing system of said input/output port.

5. The optical router according to claim 4, wherein the at least one of the optical routing systems comprises connections configured to optically connect the switches to the connector.

6. The optical router according to claim 2, wherein the at least one of the optical routing systems comprises connections configured to optically connect the switches to one another.

7. The optical router according to claim 1, wherein the optical routing systems are configured to passively direct optical signals of wavelength between 169 nm and 14 µm.

8. The optical router according to claim 1, wherein the optical paths comprise one or more waveguides in which the optical signals are intended to travel.

9. The optical router according to claim 1, wherein each of the optical routing systems comprise first and second groups of switches configured to passively direct an optical signal, transmitted by the transceiver connected to the input/output port, to one and the same other input/output port chosen on the basis of the wavelength of said optical signal, said optical routing system comprising a polarizing filter arranged upstream of the set of switches, said polarizing filter being configured to steer said optical signal to the first group of switches if said optical signal exhibits a first polarization or to the second group of switches if said optical signal exhibits a second polarization perpendicular to the first polarization, said optical routing system comprising a polarization rotator configured to rotate the polarization of the optical signal by 90°, arranged between the polarizing filter and the second group of switches.

10. The optical router according to claim 9, wherein the optical paths at the output of the first group of switches, respectively of the second group of switches, of an optical routing system being connected to the second groups of switches, respectively to the first groups of switches, of the other optical routing systems.

11. An optical communication system comprising at least one optical router according to claim 1 and, for each optical router, a plurality of transceivers configured to transmit and receive optical signals at a plurality of different wavelengths, each of the transceivers being connected to one of the input/output ports of the optical router.

12. The optical communication system according to claim 11, wherein at least one, preferably each of the transceivers being configured to transmit and receive optical signals at a plurality of different wavelengths at least equal to N−1, N being equal to the number of input/output ports of the optical router to which the transceiver is connected.

13. The optical communication system according to claim 11, wherein at least one of the transceivers comprise a plurality of lasers, each laser being configured to emit a laser optical signal having a wavelength different from the other lasers.

14. The optical communication method comprising the use of an optical communication system according to claim 11, wherein the use comprises one of the transceivers, called first transceiver, transmitting an optical signal and at least one other of the transceivers, called second transceiver, receiving the optical signal.

15. The optical communication method according to claim 14, wherein the first and second transceivers are connected to a first electronic component, respectively a second electronic component, the use comprising communicating information from the first electronic component to the second electronic component by transmitting an optical signal from the first transceiver and the second transceiver receiving said optical signal.

16. The optical communication method according to claim 14, wherein the use comprises a calibration step during which at least one of the transceivers, called transceiver to be calibrated, sends at least one optical signal at a given wavelength, and the optical signal is then received by another of the transceivers, which sends back an optical response signal indicating its identity at the same said given wavelength, and the transceiver to be calibrated then records the identity of the other transceiver and associates it with the given wavelength.

17. The optical communication method according to claim 16, wherein the optical signal transmitted by the transceiver to be calibrated indicating the identity of said transceiver and the other transceiver recording the identity of the transceiver to be calibrated and associating it with the given wavelength.

* * * * *